US009461920B2

(12) United States Patent
Centoza et al.

(10) Patent No.: US 9,461,920 B2
(45) Date of Patent: *Oct. 4, 2016

(54) MOBILE DEVICE AND METHOD FOR SWITCHING COMMUNICATION SESSIONS BETWEEN ALTERNATIVE NETWORK RESOURCES

(71) Applicant: Roke Manor Research Limited, Romsey Hampshire (GB)

(72) Inventors: Angelo Centoza, Winchester (GB); Ben Toner, Alresford (GB); Richard Morris, Southampton (GB); Kristan Barraclough, Southampton (GB); Graham Hewson, Poole (GB); Robert Pridham, Southampton (GB)

(73) Assignee: Chemring Technology Solutions Limited, Romsey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,794

(22) Filed: Dec. 23, 2014

(65) Prior Publication Data

US 2015/0280995 A1    Oct. 1, 2015

Related U.S. Application Data

(63) Continuation of application No. 13/156,868, filed on Jun. 9, 2011, now Pat. No. 8,948,810.

(30) Foreign Application Priority Data

Jun. 9, 2010    (GB) .................................. 1009649.3
Oct. 26, 2010   (GB) .................................. 1018069.3

(51) Int. Cl.
*H04M 1/00*       (2006.01)
*H04L 12/801*     (2013.01)
(Continued)

(52) U.S. Cl.
CPC ........... *H04L 47/14* (2013.01); *H04L 41/0893* (2013.01); *H04L 67/20* (2013.01);
(Continued)

(58) Field of Classification Search
CPC ...................................................... H04W 28/08
USPC ........................... 455/445, 552.1; 370/230.1
See application file for complete search history.

(56) References Cited

U.S. PATENT DOCUMENTS 8,374,123 B2    2/2013  Wentink
8,526,463 B2    9/2013  Babbar et al.
(Continued)

FOREIGN PATENT DOCUMENTS

EP      1111811 A2     6/2001
EP      2111010 A1    10/2009
(Continued)

OTHER PUBLICATIONS

Corresponding British Search Report dated Feb. 21, 2011 (one (1) page).

(Continued)

*Primary Examiner* — William D Cumming
(74) *Attorney, Agent, or Firm* — Banner & Witcoff, Ltd.

(57) ABSTRACT

Systems, methods and a mobile device for using policy defined by the operator to control the interfaces on which data is sent and received by the device are provided. The policy can be dynamically updated by the operator, by pushing new policy to the device for implementation. The policy can define that the device should switch certain data between two or more available interfaces at certain times, or when certain data may be sent or received over a particular interface. The device may receive new policy from the operator in order to help with the operator's own operational objectives, such as traffic shaping or other traffic limitation to ease congestion or enforce service agreements. A policy implementing corresponding traffic limitation or shaping on the air interface between the mobile device and network base stations can be sent to the mobile device so as to reduce signaling congestion on the air-interface.

4 Claims, 11 Drawing Sheets

(51) Int. Cl.

| | | |
|---|---|---|
| *H04W 28/08* | (2009.01) | |
| *H04W 88/06* | (2009.01) | |
| *H04L 12/24* | (2006.01) | |
| *H04L 29/08* | (2006.01) | |
| *H04W 28/02* | (2009.01) | |
| *H04W 72/12* | (2009.01) | |

(52) U.S. Cl.
CPC ......... *H04W28/0289* (2013.01); *H04W 28/08* (2013.01); *H04W 88/06* (2013.01); *H04W 72/1252* (2013.01)

(56) References Cited

U.S. PATENT DOCUMENTS

| | | | |
|---|---|---|---|
| 8,676,252 B2 | 3/2014 | Noh et al. | |
| 8,750,926 B2 | 6/2014 | Fu et al. | |
| 8,767,713 B2 | 7/2014 | Joshi et al. | |
| 8,948,810 B2 * | 2/2015 | Centoza | H04W 28/08 455/445 |
| 2003/0223384 A1 | 12/2003 | Sengupta et al. | |
| 2005/0230966 A1 | 10/2005 | Trantoul et al. | |
| 2005/0260996 A1 | 11/2005 | Groenendaal | |
| 2006/0126646 A1 | 6/2006 | Bedingfield | |
| 2006/0193295 A1 | 8/2006 | White et al. | |
| 2007/0133548 A1 | 6/2007 | Kim et al. | |
| 2010/0165949 A1 | 7/2010 | Dabak et al. | |
| 2010/0192212 A1 | 7/2010 | Raleigh | |
| 2011/0170412 A1 | 7/2011 | Ramadas et al. | |
| 2011/0306386 A1 * | 12/2011 | Centoza | H04W 28/08 455/552.1 |
| 2013/0329554 A1 * | 12/2013 | Centoza | H04W 28/08 370/230.1 |
| 2013/0339500 A1 | 12/2013 | Antonov et al. | |
| 2013/0340022 A1 | 12/2013 | Antonov et al. | |
| 2014/0233386 A1 | 8/2014 | Jamadagni et al. | |
| 2015/0016253 A1 | 1/2015 | Jaska et al. | |
| 2015/0036486 A1 | 2/2015 | McMurry et al. | |
| 2015/0280995 A1 * | 10/2015 | Centoza | H04W 28/08 455/552.1 |

FOREIGN PATENT DOCUMENTS

| | | |
|---|---|---|
| WO | 2007024887 A2 | 3/2007 |
| WO | 2008057869 A1 | 5/2008 |
| WO | 2008057874 A1 | 5/2008 |
| WO | 2008057885 A2 | 5/2008 |
| WO | 2009092008 A1 | 7/2009 |
| WO | 2010004363 A1 | 1/2010 |

OTHER PUBLICATIONS

"3GPP TS 23.402: 3rd Generation Partnership Project; Technical Specification Group Services and System Aspects; Architecture enhancements for non-3GPP accesses (Release 10)", 3GPP, vol. 10.3.0, Mar. 2011.

* cited by examiner

MOBILE DEVICE AND METHOD FOR SWITCHING COMMUNICATION SESSIONS BETWEEN ALTERNATIVE NETWORK RESOURCES

CROSS-REFERENCE TO RELATED APPLICATIONS

This application is a continuation of application Ser. No. 13/156,868, filed Jun. 9, 2011, which claims priority to United Kingdom Application GB 1009649.3, filed Jun. 9, 2010, and United Kingdom Application GB 1018069.3, filed Oct. 26, 2010. Benefit of the filing date of each of these prior applications is hereby claimed. Each of these prior applications is hereby incorporated by reference in its entirety.

TECHNICAL FIELD

This invention relates to a mobile device and in one embodiment a method of switching communication sessions of the mobile device between alternative network resources under network control.

BACKGROUND TO THE INVENTION

Conventionally, subscribers tended to limit data usage themselves in order to avoid paying excessive phone bills, but an unlimited data download tariff gives them no incentive to do so. Therefore, a provider of network capabilities needed to support the services offered to subscribers, commonly known as a mobile network operator (MNO), desires a solution by which a high number of subscribers with unlimited data download tariffs, may be offloaded from their network resources (i.e. cellular) onto other networks (e.g. WiFi) and back again, when using certain high bandwidth sessions (e.g. video), and also without having an adverse effect on the subscriber's quality of experience.

In addition, cellular network loads are expected to increase significantly, perhaps as much as three hundred fold over the next 5 years, reaching up to 2 exabytes per month of traffic globally travelling the core network and 23 exabytes annually. This has implications on the operators in terms of power, space and ability to upgrade equipment and cabling, etc. to meet this new demand. This demand will come from the uptake of high bandwidth traffic such as video (TV, user generated video content, wireless video on demand, etc., as well as from logistics applications and other industrial usage, commonly referred to as M2M (Machine to Machine)). Upgrading the mobile operator networks to cope with this challenge will be difficult and so further offload optimisations will be considered.

The difficulty with offloading current and future traffic from the operators network has been that there is not a solution which is easy to implement, works across any operator (worldwide solution), multiple operators, multiple technologies (cellular, wireless local area network, such as WiFi, or Worldwide Interoperability for Microwave Access (WiMAX), etc.), across different equipment manufacturers whilst providing the optimisation directly from the handsets to the offload point (WiFi, WiMAX, etc.), whilst maintaining control in the operators network whilst still managing the quality of service of the signal.

One conventional method by which one network operator has addressed the problem of offloading traffic from the operator's network for mobile phone applications is to use bespoke handsets together with a different Radio Access Network (RAN) piece of equipment called a Generic Access Network/Unlicensed Mobile Access (GAN/UMA). This UMA equipment solves the problem of traffic moving over the mobile operator's radio access part of the network and it also solves the problem of switching between these two types of networks seamlessly. FIGS. 1 and 2 show how this is achieved, where for simplicity it is assumed that the 'non-cellular' path always uses a subscriber's home WiFi router.

FIG. 1 illustrates an example using a Universal Mobile Telecommunications System (UMTS) network architecture. When using cellular services, such as UMTS, Global System for Mobile Communications (GSM), code-division multiple access 2000 (CDMA2000), etc., data is sent between a mobile device (UE) 10a, 10b, 10c of FIG. 1 and an internet server 29. In an access network 12 are UMTS base transceiver stations (Node B's) 13, 14 and respective Radio Network Controllers (RNC) 15, 16 by which the UE can communicate with the server 29 via a core network 22 along links Iu-cs 19, 21 or Iu-ps 1b, 20. In the core network 22 are other parts of the mobile operator's equipment including the Gateway GPRS Support Node (GGSN) 24, Serving GPRS Support Node (SGSN) 23. The communication goes over the mobile operator's permitted air interface, through the Access Network cells using the Uu interface 11 from the UE, following the links Iub 1a, Iu-ps 1b, Gn 1c, and link 1d from the NodeB 14 to the IP network 29. The core network 22 also includes mobile switching centre (MSC) 3G-MSC 26 connected to G-MSC 27 via link Nc 30 and thence to public switched telephone network/integrated services digital network (PSTN/ISDN) 28.

When using the subscriber's WiFi router as the air interface, data which is sent to a mobile device from an internet server travels through the operator's core network 22 (GGSN 24 and SGSN 23) and over the Iu-PS interface 1b as in the previous case. However, the GAN/UMA solution sends the data to a GAN Controller (GANC) 31 which transmits the data using a pre-established tunnel to the mobile device 32. This pre-established tunnel travels over the internet to the subscriber's WiFi router and is broadcast over a WiFi connection to the mobile device—this path 2 is shown in FIG. 2 The example illustrated shows a Generic IP Access Network GAN Iu mode functional architecture taken from 3GPP TS43.318.

The mobile device 32 uses the path through the generic IP access network 41 to communicate with the core network 33 via the GANC 31. There is a link Wm between an SGSN 36 of the GANC 31 and an authentication, authorization, and accounting (AAA) proxy server 39 in the core network. There are links Iu-cs to the MSC 37, Iu-ps to the SGSN 38, Iu-pc to SMLC 34 and Iu-bc to the CBC 35. The core network 33 home public land mobile network/visited public land mobile network (HPLMN/VPLMN) also includes a home location register (HLR) 40.

Software in the mobile device 32 registers with the GANC 31, which then controls the path between the operator's core network 33 and the mobile device. The GANC instructs the mobile device to handover between cellular and WiFi. Since the GANC is located in the operator's network, and is treated as an RNC, when a handover occurs data is forwarded between the RNC and GANC to provide a seamless handover. Whilst this solution provides a seamless session switching solution between two separate access technologies, there are a number of disadvantages. In addition to software on the mobile devices, the operator is required to invest in GANC devices, including the integration of the devices into their own network. Furthermore, only air interface offloading is used, meaning that the data still travels across the operator's core network, which, although still a load to the core network, gives the operator an added benefit of being able to keep each user within their network, with a benefit that they can offer value added services specific to their network users and that the core network (SGSN and GGSN) will still experience capacity problems unless they are upgraded (in which case the cost per bit traversing the core network might be increased). The solution relies on the use of a cellular connection, and cannot be expanded to cover scenarios such as the seamless switching between WiFi hotspots described above.

Current alternatives to using GAN/UMA are for the Mobile Network Operator to do nothing and allow their network to suffer from major capacity problems, or to invest in more cells/higher capacity links and core network equipment to improve the subscriber's experience on their network. The first option is considered to be unwise from a business viewpoint, while the second option is considered to be a high capital expenditure (CAPEX) and operating expenditure (OPEX) investment.

To date, solutions which have been implemented in the handset only provide options to the user to switch the air interface types on, or off. When a secondary air interface (e.g. WiFi) is switched "on", the mobile device searches, or listens, for a qualified data path to be available, (e.g. WiFi meeting a certain threshold and in range). When the secondary air interface is found and if the device is being used to send/receive data, then the mobile device automatically switches to this secondary interface (e.g. WiFi). This current solution does not allow seamless switching—from cellular to secondary air interface or vice versa, so it cannot start the traffic flow over one set of equipment and finish using a different set of equipment. In order to enable seamless switching, investment needs to be made in a solution such as Mobile IP, but this is also unsatisfactory, as it is not chosen as a global standard Nor do current solutions manage Quality of Service (QoS). Managing mobile quality of service is a requirement in 3GPP and other standard bodies to ensure that the user is provided with different levels of quality for different services. This is an important part of the standards work, as it ensures that the technology being designed can guarantee the users will be able to depend on that technology under many circumstances.

Solutions allowing for seamless bearer transfer between different technologies have been proposed by Attila Technologies, as described in US 2006193295. This solution moves in the direction of a terminal-self-contained traffic offloading technique, where the terminal will use the multi-homing feature supported by the SCTP transport protocol to establish several parallel connections through different radio access technologies and to convey traffic belonging to the same service/bearer across such multitude of connections. In fact, SCTP allows a single data flow to be transported in parallel across different IP routes identified by multiple destination addresses all assigned to the same network node. A terminal supporting SCTP communicating with a server also supporting SCTP can manage such multiple IP routes in a way that they are assigned to different radio access connections. Seamless session mobility between different radio accesses is therefore guaranteed at transport level. However, this solution relies on the fact that both peers involved in the data exchange support SCTP, which is not always the case. Furthermore, the solution requires a high level of IP address management at the terminal, due to the fact that the primary IP address used by SCTP (the address on which traffic will be preferentially routed) will need to be changed depending on the radio access on which it is most convenient to forward the traffic.

SUMMARY OF INVENTION

Embodiments of the invention are particularly applicable to the problem of users on unlimited data download tariffs on certain types of network, overloading the network, but are also applicable for industrial applications using embedded wireless, such as home medical monitoring equipment, or chip and pin readers, where a cellular connection may not always be available, or where it may be desirable to manage the connection to minimise the operational cost, where there is no unlimited data tariff.

More generally, in embodiments of the invention a mobile device that is transferring data on one or more interfaces has policy dynamically pushed to it originating at a policy generating entity such as a policy server, the received policy comprising operational instructions that instruct the mobile device to adapt the transfer of data on its interfaces so as to achieve a broader operational objective of the entity that generated the policy, or a related entity. For example, in one embodiment a policy server in the mobile operating network may generate policy for the mobile device that supplements traffic shaping or other traffic limitation measures that are being or will be undertaken in the network. In another embodiment an application server relating to an application installed on the device may push policy to the device instructing the device to transfer data generated by the application via a particular interface, or at a particular time. For example, in one embodiment a cellular device with a sensor gathers data regularly throughout the day but it is not urgent to send the data. In order to manage this and prevent data overload on a cellular interface a policy can be pushed out to the device to block the data on the cellular interface with the result that the data is sent when next in range of an alternative network interface, such as a WiFi network. In this respect the subscriber is not expecting a real time service and instead may use a lower quality of service which should cost less. For example, a heart rate monitor application that reports back to a server via a network may be subject to a policy received from the server that dictates when heart rate generated by the application should be transmitted back to the server, and by what interface, e.g. using the home WiFi interface every night between 12 am and 1 am.

From one aspect the invention provides a method of operating a mobile device, the mobile device comprising at least a first physical networked interfaces and a control module; wherein the interface is adapted to send or receive data from a data source; the method comprising: transferring data from the data source through the first physical networked interface; in the control module receiving a configuration update from the network operator, the configuration update comprising a third party defined policy that indicates to the mobile device one or more data adaptation rules including data characteristics relating to data the transfer of which through the first physical networked interface is to be adapted; and adapting the transfer of data through the first physical networked interface in response to the received third party defined policy, wherein the data transfer adaptation rules in the third party defined policy are set so as to cause the mobile device to operate so as to support operational objectives of the third party.

With the above it is possible for a third party such as a network operator or other service provider to push new policy to the mobile device to cause the mobile device to alter its data transmission on the interface. Thus, the operator or other service provider can remotely control the device to implement new data transmission characteristics.

In one embodiment the mobile device further comprises at least a second physical networked interface, the first and second interfaces adapted to send or receive data from one or more data sources. Here, in response to the received third party defined policy, the mobile device may further initiate a connection through the second interface; and transfer data having the data characteristics defined in the third party defined policy through the second interface. With such an arrangement the network operator or other service provider is able to remotely instruct the mobile device to use a different interface for data, for example to switch from a cellular interface to a WiFi interface.

The adapting that is undertaken may further comprise blocking the transfer of data having the characteristics defined in the network operator defined policy. Moreover, the data characteristics may define any of i) a particular type of data; ii) a period of time for which the transfer of data is to be adapted; iii) a location at which the transfer of data is to be adapted; and/or iv) a particular application that requests or generates data.

In this regard the third party defined policy may further define a period of time for which the transfer of data is to be adapted. The defined period of time may for example be a length of time, or a range of time between two specific times or dates, or a discrete start or a stop time or date.

Additionally the third party defined policy may further define a location or group of locations at which the transfer of data may be adapted when the mobile device is at the location. The "location" may be a geographical location, such as when at or within a certain distance of a particular or range of latitude and longitude coordinates, or a relative location, such as, for example, when inside a building, or a mode of transport such as a car, bus, train, or aircraft.

In one embodiment the third party defined policy may be received from the network operator when the network operator is engaging in traffic shaping or other traffic limitation measures, the policy defining data characteristics of data that the network wishes to limit. This has advantages in that the traffic policy then being applied at the mobile device is supportive of the traffic policy being applied in the network. In addition, signalling between the device and the network is reduced, as the device will not generate data control plane traffic relating to data that the network will in any event block. The data that is limited includes both traffic control data such as network signalling traffic, as well as traffic relating to the data that the device may otherwise have tried to access, including content data itself, as well as meta data describing the content, and access control and authentication data required to access the content.

In another embodiment the third party is a service provider running a server with which the mobile device interacts by transmitting data relating to the service, and a service provider defined policy is received from the server as the third party defined policy when the service provider wishes to vary characteristics of the data transferred from the mobile device to the server. Again, this allows the service provider to adapt the operation of the mobile device remotely so as to allow the service provider to meets its own operational objectives. For example, a service provider may wish to receive data relating to the service that it provides at a particular time of day so that it can then process the data in a batch process scheduled to run at a certain time.

In one embodiment the network operator defined policy is an XML file comprising policy condition definitions and policy action definitions. Such a representation has advantages in that it is easily parseable, and is supported by the operating systems of many mobile devices.

Another aspect of the invention provides a method of traffic shaping in a mobile communications network, comprising: determining that a traffic shaping condition is met; and in response to the determination, initiating traffic shaping measures; characterised in that the traffic shaping measures comprise: sending a configuration update to a mobile device wirelessly connected to the network via a first physical network interface, the configuration update comprising a network operator defined policy that indicates to the mobile device one or more data characteristics, the data characteristics relating to data the transfer of which through the first physical networked interface is to be adapted.

This has the advantages mentioned above in that the traffic policy then being applied at the mobile device is supportive of the traffic policy being applied in the network. In addition, signalling between the device and the network is reduced, as the device will not generate any traffic relating to data that the network will in any event block. As noted above, the traffic that is limited may be network signalling traffic on the network control plane, as well as traffic relating to the actual content data itself, including content data, meta data relating to the content data, and access data, such as authentication data required to access the content, amongst others.

In embodiments of the above, the first interface comprises a cellular interface and the second interface comprises a WIFI or WIMAX interface.

From another aspect there is provided a mobile device, comprising: at least a first physical networked interface adapted to transfer data from a data source; and a control module arranged to receive a configuration update from a third party, the configuration update comprising a third party defined policy that indicates to the mobile device one or more data transfer adaptation rules including one or more data characteristics, the data characteristics relating to data the transfer of which through the first physical networked interface is to be adapted; wherein the first physical networked interface is further arranged to adapt the transfer of data therethrough in response to the received third party defined policy.

In one embodiment the mobile device further comprises at least a second physical networked interface, the first and second interfaces adapted to send or receive data from one or more data sources, wherein in use in response to the received third party defined policy the mobile devices initiates a connection through the second interface and transfers data having the data characteristics defined in the third party defined policy through the second interface.

In accordance with another aspect of the present invention, a method of operating a mobile device is also provided, the mobile device comprising at least two physical networked interfaces and a control module; wherein each interface is adapted to send or receive data from common data sources; the method comprising transferring data in a session through a first interface; in the control module monitoring information associated with the data transferred through the first interface in the session and characterising the information in the session; determining from the characterised information whether to initiate a connection using a second interface; initiating the connection; and transferring data through the second interface.

In one embodiment of the present invention, a control module is embedded in a wireless device for the purpose of autonomously establishing multiple sessions to a network application supporting multiple connections to the same source material, and presenting a single connection to the application layer, made up of content received through any of the established connections. The control module determines from the monitored information whether some or all of the data being sent/received on the first interface will benefit from being transferred to the second interface. Using the monitored data and optionally other information available on the device, the control module determines if and when the interface should be changed to improve efficiency, to save on data costs or battery, or to manage quality of service.

In particular, in one embodiment policies can be pushed from the network to block certain types of traffic but according to time of day, or some other time element, for example, for a certain length of time after receipt, or for a certain length of time after an indicated time in the policy.

Preferably, the data transfer through the second interface is in addition to data transfer through the first interface.

This is particularly useful where the data comprises a message which includes a significantly larger attachment, allowing the attachment to be sent via the second interface more efficiently.

More specifically, in one embodiment a policy can be pushed to the mobile device that specifies that the mobile device can allow message traffic to be sent but that prevents the transfer of attachment data such as documents or images. This is performed by having the applications interact with the control module. Such is necessary because the policy engine in the network could be blocking all network traffic unless the control module provides some authorisation that an application is requesting small amounts of non-attachment data and the traffic shaping policy in the network is then temporarily relieved.

Preferably, the control module terminates transmission through the first interface upon initiating the connection through the second interface.

In some circumstances, all of the data transfer is moved from one interface to the other, so the connection at the first interface is terminated.

Preferably, further information is accessed by the control module to assist in determining whether to move some or all data transfer between the interfaces.

Preferably, the criteria used to determine from the characterised information whether to initiate a connection using a second interface include at least one of energy requirement to transmit or receive, expected duration of transmission or reception; and quality of service.

The control module uses the further information to make a decision as to which is the appropriate interface or interfaces to select for efficient data transfer. Amongst other criteria, this may be in terms of any of energy used by the mobile device to transmit or receive data, the duration during which the data will be transferred and the quality of service that the data will receive. The control module is able to take into account all of the available information to decide which combination of interfaces will best suit the predicted traffic which is to be sent to and received from the mobile device. This assists in reducing the overall power used to transmit or receive, whilst ensuring that the quality of service expected by the sessions is maintained.

Preferably, the monitored information comprises one of connection & disconnection parameters; source or destination location; security information; traffic type; and rate of data exchange. In this respect, when a policy is being applied the policy is usually associated to an application type or a traffic type so in order to block such traffic the device needs to know such data is present.

The control module analyses data sent to and/or received from the mobile device to determine session details. Traffic types monitored by the control module may be characterised as applications or protocols known to generate large amounts of data over a network, such as, for example HTTP, SMTP, RTP, FTP etc. The control module may in one embodiment inspect packets of these traffic types looking for certain messages or message content, although in other embodiments no such inspection may be required. An example of certain messages that may be inspected is an HTTP GET message with YouTube as the destination.

Preferably, the monitored information comprises at least one of IP and transport layer parameters available in session setup and update messages, application layer parameters, bearer information; and real time information.

Preferably, the application layer parameters include codec selection and frame formats; the bearer information includes delay budget, packet error rate and DiffServ codepoint; and the real time information includes packet numbers and timestamps.

However, other features may also be included.

Preferably, the further information is locally stored.

Preferably, the locally stored information includes any of status information about interfaces turned on or off, battery level, available wireless access points, signal strength, geographical location, the processor load of network enabled applications and the data usage statistics of network enabled applications. In one embodiment one or more of these inputs are taken into account by a policy engine in trying to determine whether a policy is to be applied, revoked, or altered.

The control module takes many parameters into consideration, including device information, such as whether interfaces are turned on or off, battery level, available WiFi APs, signal strength and geographical location etc, operator policy, such as preferred cellular technology, weighting parameters and time of day profiles etc., and user policy, such as how the control module makes decisions such as desired battery performance, desired cost not to exceed in a billing period, desired, allowed or not allowed WiFi APs etc. User policy management can be done by simply allowing the user to define the outcome and developing policies that give the user an expected result.

Preferably, the control module applies network operator and mobile device user defined policies.

Preferably, the control module stores network operator and user defined policies to influence the decision to initiate a connection to the source through the second interface. Additionally or alternatively, the policies may be used to influence the decision to send or receive data, or certain types of data, on a single interface. For example, where traffic shaping in the network is occurring, a policy may be pushed to the mobile device to control the data that the device sends on the cellular interface.

Preferably, the control module is adapted to receive configuration updates from the mobile network operator.

The configuration updates update networked connections with which the control module operates.

Preferably, the control module reports connectivity and service quality information to a mobile network operator through whichever of the interfaces remains connected. For example, reporting information to the network operator may occur either directly or indirectly over a logical connection to the PCRF module in the network.

The control module also has a 'Statistic Reporting Function' which retrieves statistics for reporting back to network operators information such as amount of data transferred over each of the device's interfaces, a summary of the type of data transferred over each interface etc. The type of information stored is dependent on the mobile device's memory capacity and can be configured using an operator policy Preferably, receipt of data over the first and second interfaces may be synchronised through monitoring packets received on the first interface; determining transmission delays; and requesting a packet at the second interface having a packet number different from the packet number currently received at the first interface.

One way of achieving the synchronisation is to ask for a packet at the second interface, which has a packet number ahead of that being received at the first interface, so that any delays in signalling and transmission can be allowed for.

Preferably, transmission of data over the first and second interfaces may be synchronised through monitoring packets sent on the first interface and transmitting packets on the second interface having a packet number different from the packet number currently sent at the first interface.

Preferably, receipt of packets at the first interface is terminated with receipt of a packet having a packet number before the packet number requested at the second interface.

This results in a switch over without overlap, so minimising the power requirement of the mobile device.

Preferably, the last packet number received at the first interface is one less than the first packet number received at the second interface.

Some protocols such as real-time transport protocol (RTP) running on user datagram protocol (UDP) are still able to operate without guaranteed repetition of packets if some go missing when using a switchover without overlap.

Preferably, the second interface receives data concurrently from the same source; and wherein the control module is adapted to synchronise the data received at the first and second interfaces from the source and to terminate the connection at the first interface.

To achieve seamless switching from an existing data stream from a remote source, the control module causes a second interface to be connected and for a period of time, the same data from the remote source is received via both interfaces. Once the data streams have been synchronised, taking account of different paths taken to the mobile device, the first data stream can be terminated by disconnecting the first interface. The user does not notice the transfer, or perceive any change in the quality of service, whilst the network can transfer the data stream to network resources which are under less pressure.

Preferably, the control module forwards the data to the output.

Data is forwarded by the control module, from whichever interface is connected, so that it can be output according to the user's requirements and when receiving through both interfaces, the synchronised data is forwarded.

In accordance with a further aspect of the present invention, a mobile device comprises a first interface; a second interface; a control module and an output, wherein the first interface is adapted to be connected to receive data from a source; wherein the second interface is adapted to be connected to receive data from the same source; and wherein the control module is adapted to monitor information associated with the data received at the first interface; process the information; synchronise the data at the first and second interfaces; and establish a connection at the second interface in accordance with the processed information.

The connection at the second interface is controlled by the control module according to the information which is monitored during receipt of data at the first interface, allowing effective synchronisation of the data streams. The control module may synchronise without data overlaps occurring, to conserve power, or with data overlaps to improve reliability.

In one embodiment, the second interface receives data concurrently from the same source; and wherein the control module is adapted to synchronise the data received at the first and second interfaces from the source and to terminate the connection at the first interface.

Seamless switching of traffic for improved reliability and quality is achieved by receiving data simultaneously via different interfaces, from the same source, for a period of time, synchronising the data within the mobile device to take account of different paths taken to the mobile device, then terminating reception via the first interface, leaving the data transfer to continue via the second interface.

Preferably, the control module forwards the data to the output.

Data is forwarded by the control module, from whichever interface is connected, so that it can be output according to the user's requirements and when receiving through both interfaces, the synchronised data is forwarded.

Preferably, the output is one of audio, video or a third interface.

Preferably, the third interface is adapted to forward the data to a remote device.

Preferably, each interface comprises layer 1 and layer 2 of an open system interconnection model.

The control module may forward data to the output, directly, or via a separate software application, but preferably the control module is embodied in a software application.

Preferably, one interface connects to network resources via a wired or wireless connection and the other interface connects to network resources via a wired or wireless connection.

The control module is a separate software entity from the network interfaces, meaning that no hardware or software changes to the interfaces are required Preferably, one interface connects to network resources of one mobile network operator and the other interface connects to network resources of another mobile network operator.

Preferably, the mobile device further comprises a cellular wireless modem for each mobile network operator.

Preferably, the mobile device comprises one or more further interfaces.

Additional interfaces may be provided to cover multiple network resource connection options, although data is only received via one or two interfaces at any time.

Preferably, the first interface comprises a cellular interface and the second interface comprises a WIFI or WIMAX interface.

Preferably, the mobile device comprises an embedded wireless device, a logistics device, a mobile telephone, laptop or pda.

BRIEF DESCRIPTION OF THE DRAWINGS

An example of a mobile device and a method of switching in the mobile device, in accordance with embodiments of the present invention will now be described with reference to the accompanying drawings in which:

FIG. 5 illustrates a mobile device moving between operators using the method of the present invention;

EMBODIMENTS OF THE INVENTION

Figure 1:
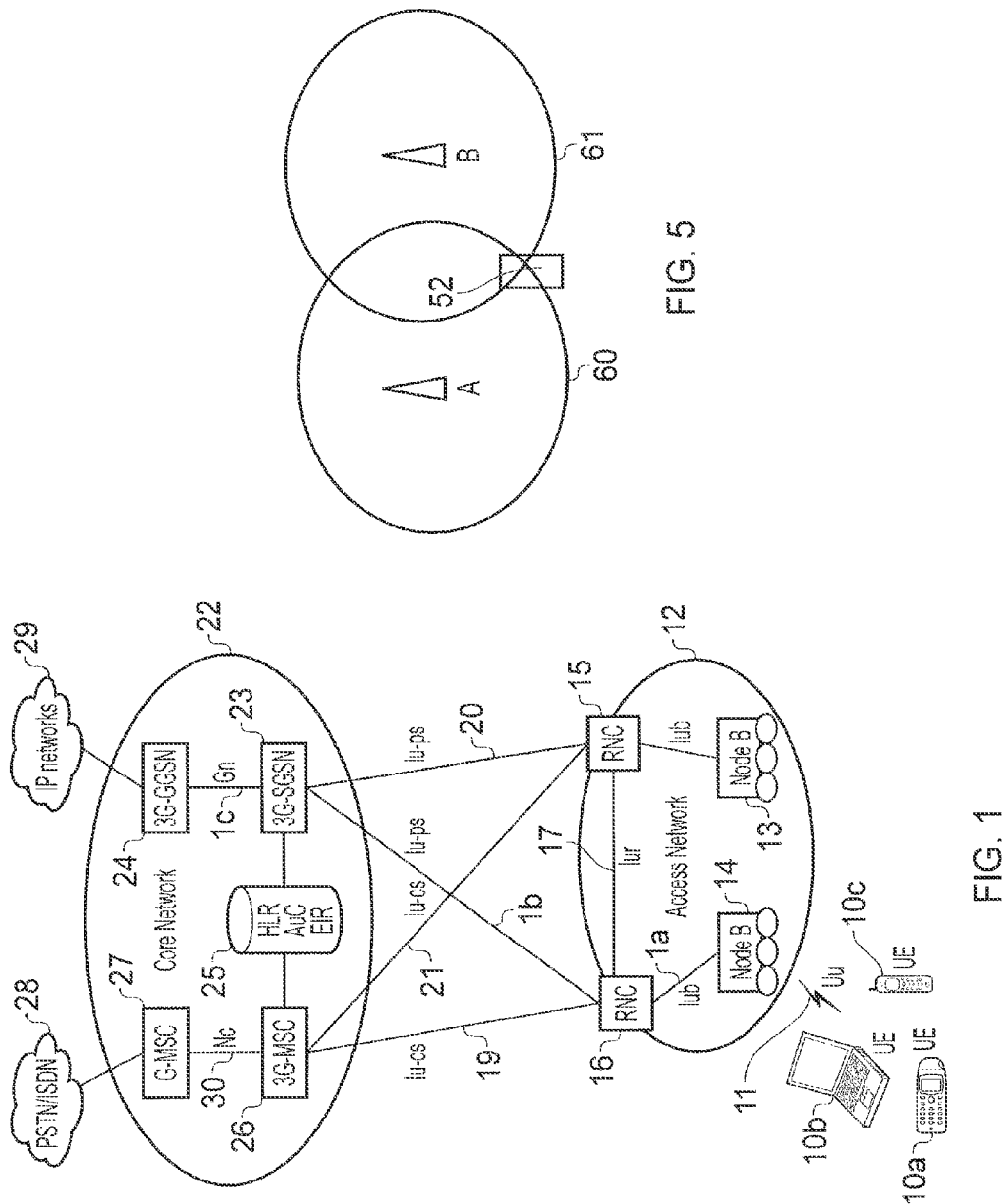
FIG. 1 illustrates a prior art Universal Mobile Telecommunications System (UMTS) network architecture.
Figure 2:
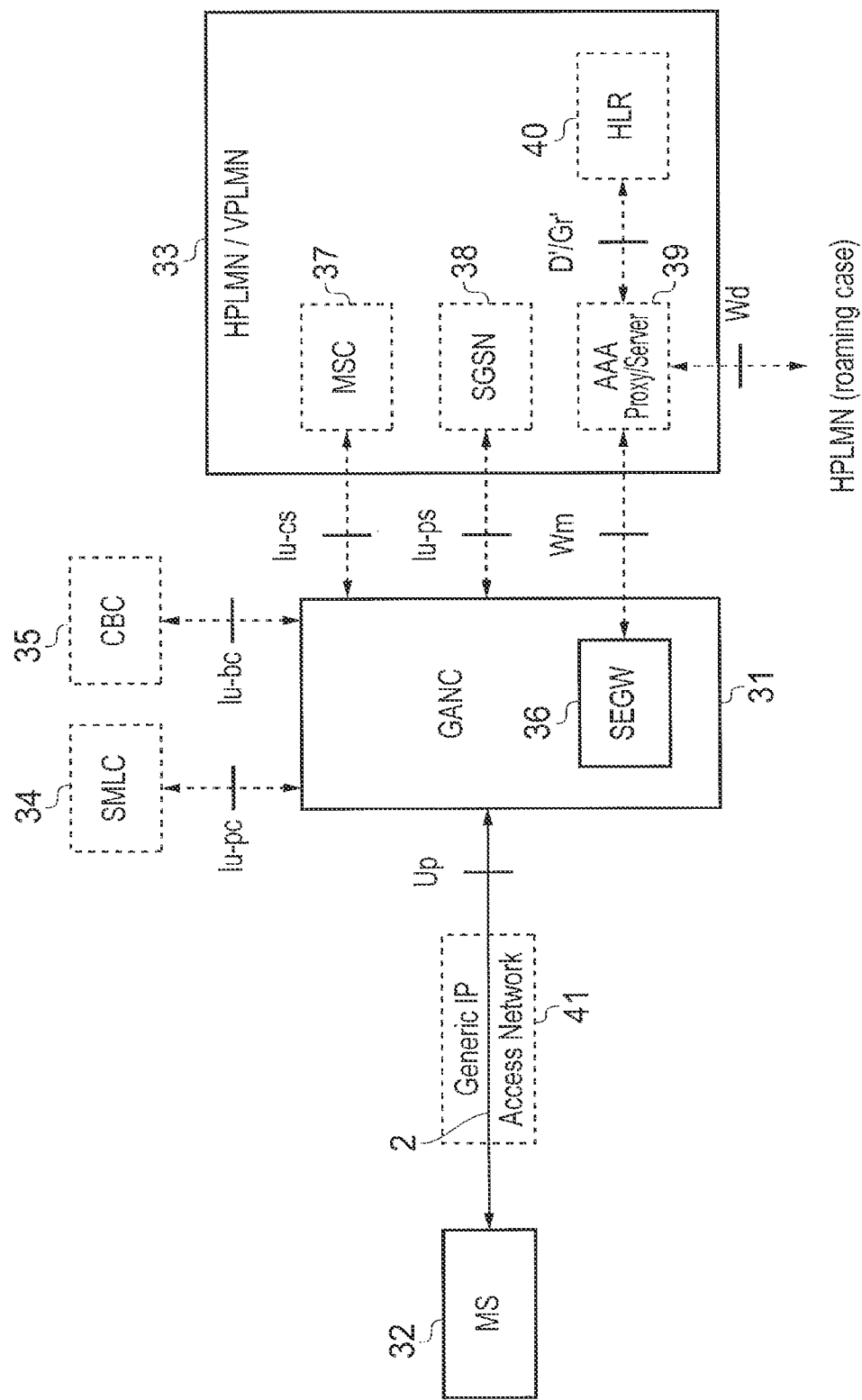
FIG. 2 illustrates a prior art Generic IP Access Network GAN Iu mode functional architecture.

Embodiments of the present invention provide a control module 53 embedded in a wireless device 52 that enables an ability to maintain a data session with a networked service during a change of mobile interface and possibly the mobile device's IP address for networked services that serve content from servers that can inherently support a multi-session capability of the same content to multiple unique IP addresses. This mechanism is utilised to access the same content over more than one networked path with a unique IP address. This may result in the content being split between the paths, such as a message and an attachment, or the same content being received over both paths and then aligned within the mobile device, so that the content forwarded to the end application may come from either of the network paths. The present invention looks into traffic flows and protocols to make intelligent decisions on how and when to switch between interfaces according to the nature of the traffic. In this way the control module is able to autonomously set up new connections from separate IP addresses.

In addition, embodiments of the invention make use of a policy engine that is able to receive a policy originating at a policy server (PCRF) in the network and operated by the network operator, and evaluate the policy to determine whether it is to be applied. The policy may be received via a logical connection with the policy server, or from an intermediary interface or gateway. A "policy" is typically a set of operational rules for the mobile device, specifying, for example, which interfaces should be used when for which types of data. A policy may further have location based elements in it, defining which types of data should be transferred through which interfaces for a particular location or range of locations. Any particular policy may have some or all of these operational rule elements, for example a policy may have any of:

i) rules relating to which interfaces particular data is to be transferred on irrespective of any of time, date, or location;

ii) rules relating to which interfaces particular data is to be transferred on dependent on any combination of one or more of time, date, location, or other variable factors specified in the policy, such as battery life.

The policy is set out in a predetermined format, for example an XML format as described further later, and can be parsed by the policy engine, and the conditions set out in the policy compared to the present operational conditions experienced by the mobile device to determine whether the policy should be applied. Alternatively, the policy may not have conditions that need be met to be applied, and may instead be mandatory.

However it is decided to apply a policy, when applying the policy the mobile device then adapts its operation to follow the rules set out in the policy. In the context of the present embodiments, the adaptation relates to adapting what data is sent over the device's interfaces and when. For example, the device may typically have a cellular interface and a WiFi interface, and the policy may specify that certain types of data are to be sent over a particular one of the interfaces at a certain time. For example, the policy may specify that data of certain types, or all data, are to be sent over the WiFi interface, instead of the cellular interface. The certain types of data to be sent over the WiFi connection may be data that is large in size, such as video or image data, file attachments, or the like.

One particularly advantageous embodiment of the invention relates to where policy is pushed dynamically to the mobile device from the network, the policy typically originating from the policy module (PCRF module) in the network in order to support operational objectives of the network operator at that time. For example, the network operator may be engaging in one or more traffic shaping or admission control procedures in order to try and manage congestion on the network, or to ensure that various Quality of Service (QoS) requirements of the network users are met. Another example is where the network operator engages in management of the mobile device's use of the network in order that the device stays within the terms of its subscription agreement. Where such traffic shaping, admission control or other data traffic limitation techniques are being used, then in order to support the traffic limitation techniques a new policy may be pushed to the mobile device which instructs the mobile device not to try to send traffic or request traffic which is subject to transport limitation in the network. The advantage of so doing is that congestion on the radio interface between the mobile device and the base station is reduced, as signalling relating to the limited traffic flows does not occur or is reduced.

As one example of traffic limitation or shaping that may occur, the network may be blocking HTTP Get messages requesting video data from a video server site such as YouTube®, or may be blocking video data from websites. To supplement this traffic shaping policy, the policy server in the network pushes to its mobile device an XML policy file that instructs the device not to forward on requests for video data, or not to forward on HTTP GET messages requesting traffic from particular websites such as YouTube® or the like, that may be listed in the policy. When implementing the policy the device then does not request data of the type defined by the policy over the indicated interface (usually the cellular interface), and hence no signalling relating to the data is generated. As noted previously, traffic relating to the actual content that the device would otherwise have tried to access is reduced or prevented entirely, together with meta data relating to the content, access data such as authentication details, and network signalling traffic, amongst other related traffic.

Figure 3C:
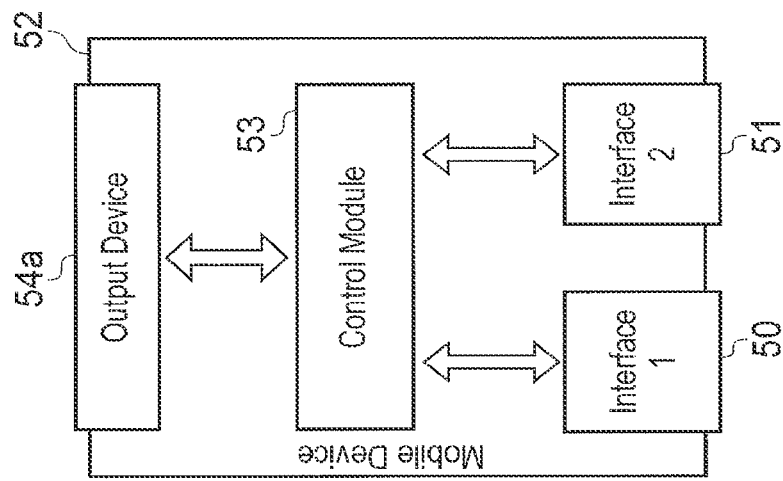
FIGS. 3a to 3c illustrate example of the invention in which a control module is separate from an application, or integrated with an application, or completely separate from the application because the output is to another networked interface.
Figure 3B:
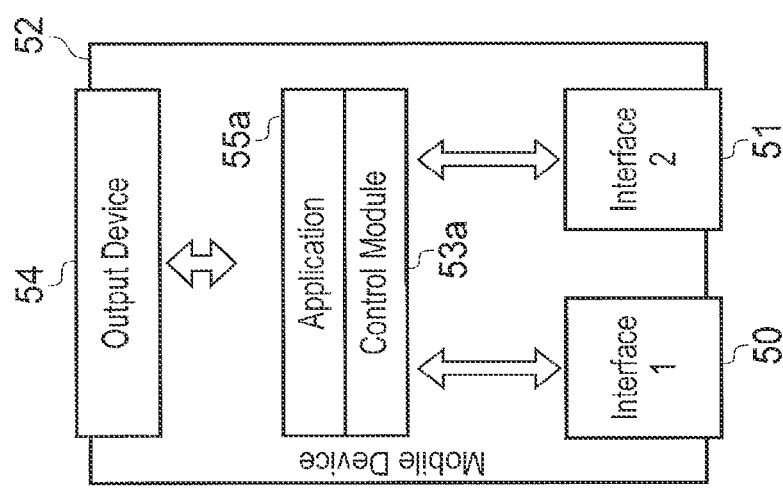
Figure 3A:
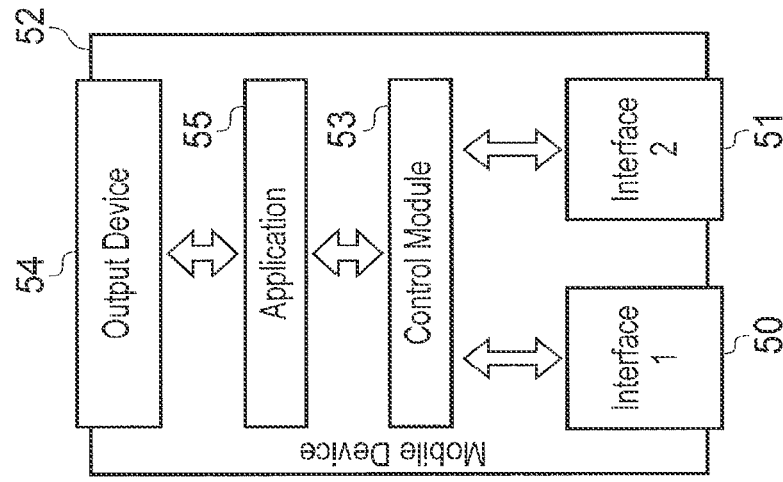

Examples of a number of different embodiments of the present invention are illustrated in FIGS. 3a to 3c. A mobile device comprises at least two physical interfaces 50, 51, a control module 53 and an output 54. The output may forward output data, e.g. to an entertainment system, or it may be an audio or visual display. In those embodiments where it is a display, an application 55 is also provided within the handset, either integrated with or separate from the control module 53.

In the examples of the invention shown, there are two or more separate physical interfaces 50, 51 on a mobile device 52, where each interface has at least its own (wired or wireless) Layers 1 and 2 of the Open System Interconnection (OSI) model. Data is capable of being received on both of these interfaces from a single remote data source. The mobile device has an output 54, which may be either audio or visual, using an application layer 55 in the mobile device, or alternatively the output is a third interface 54a, wired or wireless, for forwarding data to a remote device (e.g. in-car entertainment centre). The third interface may itself comprise an application. In the case of logistics applications, the mobile device may receive data from e.g. a blood pressure monitor which has recorded readings over a period of time. In the invention the control module 53 is physically located within the mobile device 52 and a seamless data stream is provided to the output device 54. The control module 53a may be a part of an application 55a running on a mobile device, as in FIG. 3b, or the control module 53 may be located lower in the OSI model as shown in FIG. 3a.

Figure 4:
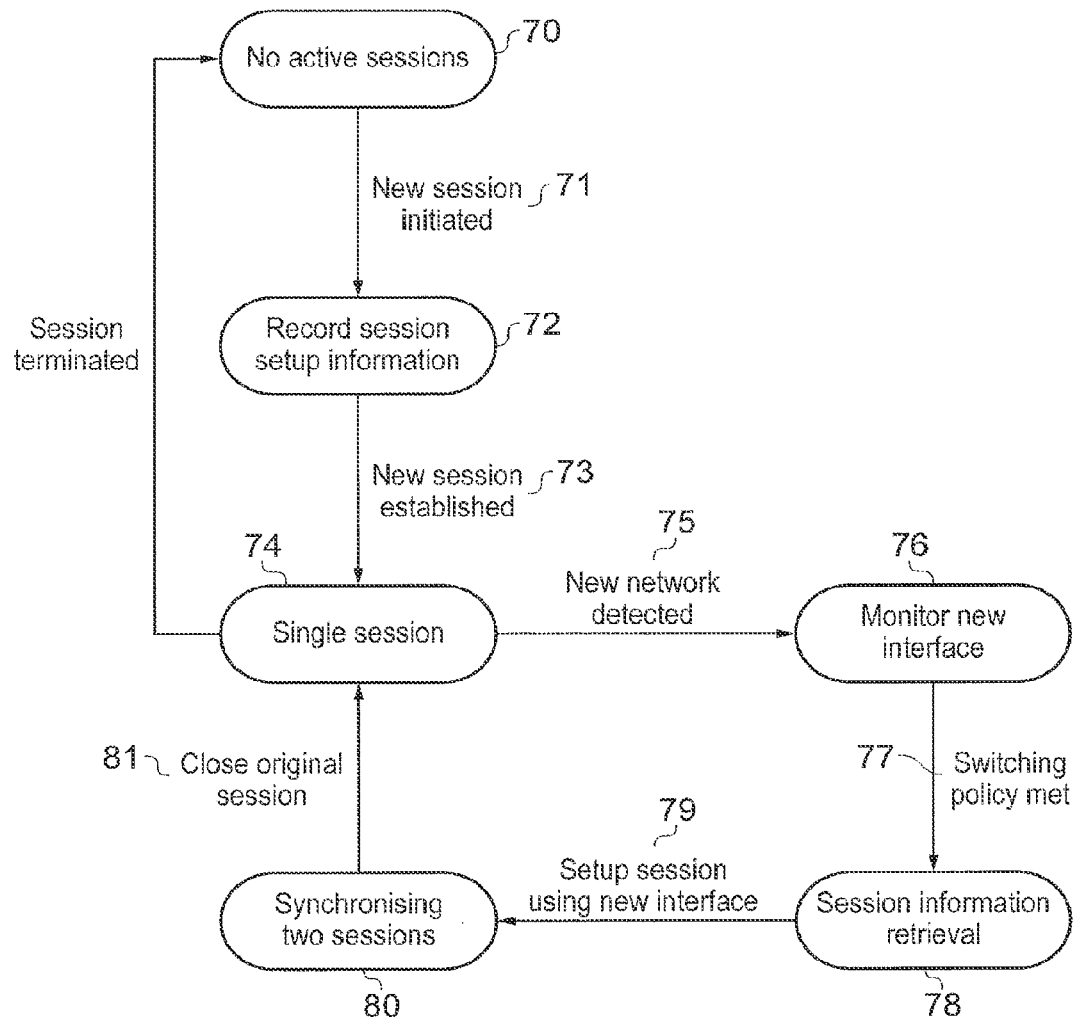
FIG. 4 shows a state transition diagram for the switching process of the present invention.

In FIG. 4, the switching process is illustrated in more detail. Starting with a mobile device 52 which has no active sessions 70, a new session is initiated 71 and session setup information is recorded 72, then a new session is established 73. In the scenario where Interface 1 50 is being used to communicate with a remote source, the control module 53 monitors certain information which is transferred over Interface 1. The information being listened to may include IP and transport layer parameters available in session setup and update messages, application layer parameters such as codec selection and frame formats, bearer information such as delay budget, packet error rate and DiffServ codepoint, as well as certain real time information (e.g. packet numbers and timestamps). In general all the information needed to describe the data flow on interface 1 may be monitored.

Whilst running a single session 74, the mobile device determines 75 that it has connectivity through Interface 2. The control modules monitors 76 the new interface and as the control modules switching policy is met 77, the control module decides to initiate a session switch so that Interface 2 is used. Using 78 the stored information about the original session, the control module communicates with the remote source via Interface 2 to set up 79 a new session with the source using the new interface 51. There are a number of different ways in which the switching may be effected. In one of these, the monitored data provides information about a packet, frame or session number of data received at the first interface. This may be incremented by an appropriate amount to allow for transmission and set-up delays, then the second interface is instructed to connect to start receiving at a specified packet, frame or session number.

In an alternative scenario, where it is important to achieve seamless transfer, data is received concurrently via both the first and the second interface and the control module synchronises 80 the data of the two sessions, so that a seamless data flow is provided to the output device. The control module then closes 81 the original session. Whether running via the original or a new interface, at the end of a single session, the session is terminated 82.

In another embodiment, the data stream is of a type which is made up of more than one part, at least one having a relatively small size and one being relatively large. An example of this is the text part of an email message, which is small in size e.g. a few kB and an attachment, which may be large e.g. several MB. The smaller part, the text message, is received over the first interface e.g. over a cellular connection and may be displayed to the user. If connectivity is detected for a suitable second interface, e.g. a WiFi bearer, the control module may choose to instruct a connection via that second interface for the purpose of downloading the larger part, the attachment.

The invention takes the connection management component (the information monitored by the control module, as referred to above) of a user application 55 that would typically connect to a networked application and innovatively uses it within the policy managed control module 53 to establish connections over available interfaces 50, 51 without any need for user interaction.

The control module 53 only provides this functionality to network connections that it has previous information about. In certain uses, the control module has to synchronise traffic for the application running on two parallel connections in a way that the application layer will seamlessly decode presented data when traffic is switched from one connection to the other.

In other uses, the control module controls the precise timing of the switch. For all other connections, they are transparently passed through the control module as if it were not present. For example, therefore, data that is restricted from the cellular network by policy may be delayed, and that data accessed at another time when a WiFi connection is present or the network operator is happy for that traffic to be sent at that time.

The control module may implement a common architecture for establishing and managing typical networked connectors and be given specific information about the applications for which it would be required to support multiple connections.

This specific application information may be in the form of a configuration file written in a defined descriptive language which can be remotely uploaded to the mobile device so that the embedded control module can be given information dynamically about networked connections (application types) which it is to support. This can happen while the user is in control of the mobile device and does not require user interaction to apply this updated configuration. The configuration file would typically originate from the policy server (PCRF) in the network and the content determined by the PCRF to augment its own capability and operational objectives at that time. Further details of an example configuration file comprising a new policy are given later.

In addition to enabling substantially seamless transfer between data streams and efficient download of high load items, the control module may also be used to maintain a connection with the mobile network operator regardless of the data connection interface in use at that time, for the purpose of periodically reporting information about the connectivity and service quality, allowing the mobile network operator to give commands to the control module to remotely manage the chosen connectivity, taking advantage of whichever connection type was active.

Although providing a policy controlled connection manager has been done in other situations, in embodiments of the present invention, the control module 53 may be operated in such a way as to maintain connectivity with the network operator, providing the operator with a constant access to extend, override, or manage, the embedded policies in use based on instantaneous information such as service quality of a non-network operator controlled connection. This is particularly important where a contract exists between the user and the operator that defines a service quality that should be maintained. For example, the contract may include a price plan that defines application usage for that subscriber and may include an element of location or time. That is, for example, the contract may include could be one set of restrictions on the home network and another when roaming.

Equally, the operator may control the modification or removal of traffic sessions transferred to radio access networks not managed by the operator.

As an example of the network operator helping to police the contract between the itself and the user of the mobile device, a policy server in a network may enforce the price plan that the subscriber has chosen and this i may be performed by limiting or shaping traffic in the core network. The problem here is that the traffic still goes over the air interface and creates congestion in both signalling and data to then only be blocked in the core network. By extending the traffic limiting or shaping policy out to the mobile device, traffic that will be blocked in the core network can then be prevented right back at the mobile device to avoid unnecessary congestion on the air interface.

Equally, and as discussed earlier, the above pushing of policy to the mobile device to extend the network traffic limiting or shaping out to the mobile device may also be performed at other times, and not just to help police the mobile device's own subscriber terms. The network operator may also push traffic shaping or limiting policy to the device for implementation when the network is experiencing congestion for others reasons, either through heavy demand, reduced network infrastructure capacity, or combinations of the two.

Another example embodiment is where the mobile device is, for example, running a sensor application that generates sensor data. In this example, there needs to be a way of getting a policy onto the device that is simple and easy. In one embodiment an application is provided that is run on a home PC (which may be a web based application) that the subscriber runs when the mobile device is at home and in range of their WiFi. The result of the application is that a policy is created which uses the cell id of the current location, the WiFi access credentials that the subscriber has just put into the pc application and finally some manufacturer preset of the data types that are allowed to be delayed. The policy is then run on the mobile device and has the effect of i) stopping all sensor data that can be delayed from accessing the cellular network and then ii) creating a system message to notify the device that it is now in range of the known and authenticated WiFi, and that the collected sensor data can thus be sent over the WiFi connection.

The control module may record certain traffic and network connection patterns and report these to the Mobile Network Operator to enhance the switching policy. This may require the use of an additional device in the network such as the policy server (PCRF) in order to provide a central point for the mobile device's control module to interact with. However, the cost of such a device will be relatively cheap compared to a GANC node and does not even need to exist within the operator's infrastructure, so could possibly be outsourced to a hosting company.

In summary, some embodiments of the present invention are able to automatically switch between receiving real time data on one physical interface of a mobile device to receiving some or all of the data on a separate physical interface, for example two separate wireless/wired modems. This solves the problems of offloading certain high bandwidth services from one access technology to another without interrupting the subscriber's session(s); facilitating reliable wireless communication paths in multi-network; and facilitating the seamless switching of sessions between wireless and wired connections as appropriate.

In other embodiments of the invention, rather than switching sessions between two or more interfaces data access through any particular interface is policed in a time-division manner so that certain (up to all) data is not sent or received through a particular interface at a certain time, or at least is limited. The data to be blocked or limited may be defined in a policy that is dynamically received from the network operator, and which may also define the time period for which the limitation applies.

Embodiments of the invention may also allow an authority such as the policy server (PCRF) in the network to configure the control module remotely, including the updating of policy information.

Embodiments of the invention may also address a number of other problems, for example, in high mobility scenarios where reliable wireless communications are important (e.g. local authority, armed forces etc), there needs to be a solution to facilitate switching of sessions between different wireless networks which do not have an in-built handover mechanism and can be using a mix of proprietary and standardised or a mix or standardised protocols (different operators). It is desirable that in the example where the interfaces 50, 51 of the mobile device are two cellular wireless modems (one for Operator A and one for Operator B), then when the device 52 moves to the edge of Operator A's coverage 60 and comes into range of operator B's coverage 61, the mobile device is able to switch sessions to Operator B's network, or similarly, if a mobile device has two bespoke radios it is desirable that it can switch from one wireless coverage area to another, either by the device moving, the coverage area moving (e.g. airborne hotspot) or if both are moving.

In a situation where a mobile device is being used wirelessly, and is then docked (i.e. connected through a cable to a power source which also houses a network point), the device may need to switch seamlessly between receiving data from a wireless connection to receiving it from the wired connection, thereby conserving wireless resources.

In both of the scenarios described, the mechanism can be any of those described above, whether aligning by advance determination of the first packet, frame or session that the new interface should handle, or by seamless switching using an overlapping period of simultaneous transmission.

A further embodiment of the present invention will now be described, that illustrates in further detail the operation of the policy engine.

The further embodiment provides a mobile device application that uniquely augments user experience in data performance, battery life and data cost control with the objectives of the network operators to increase the value of data.

Figure 6:
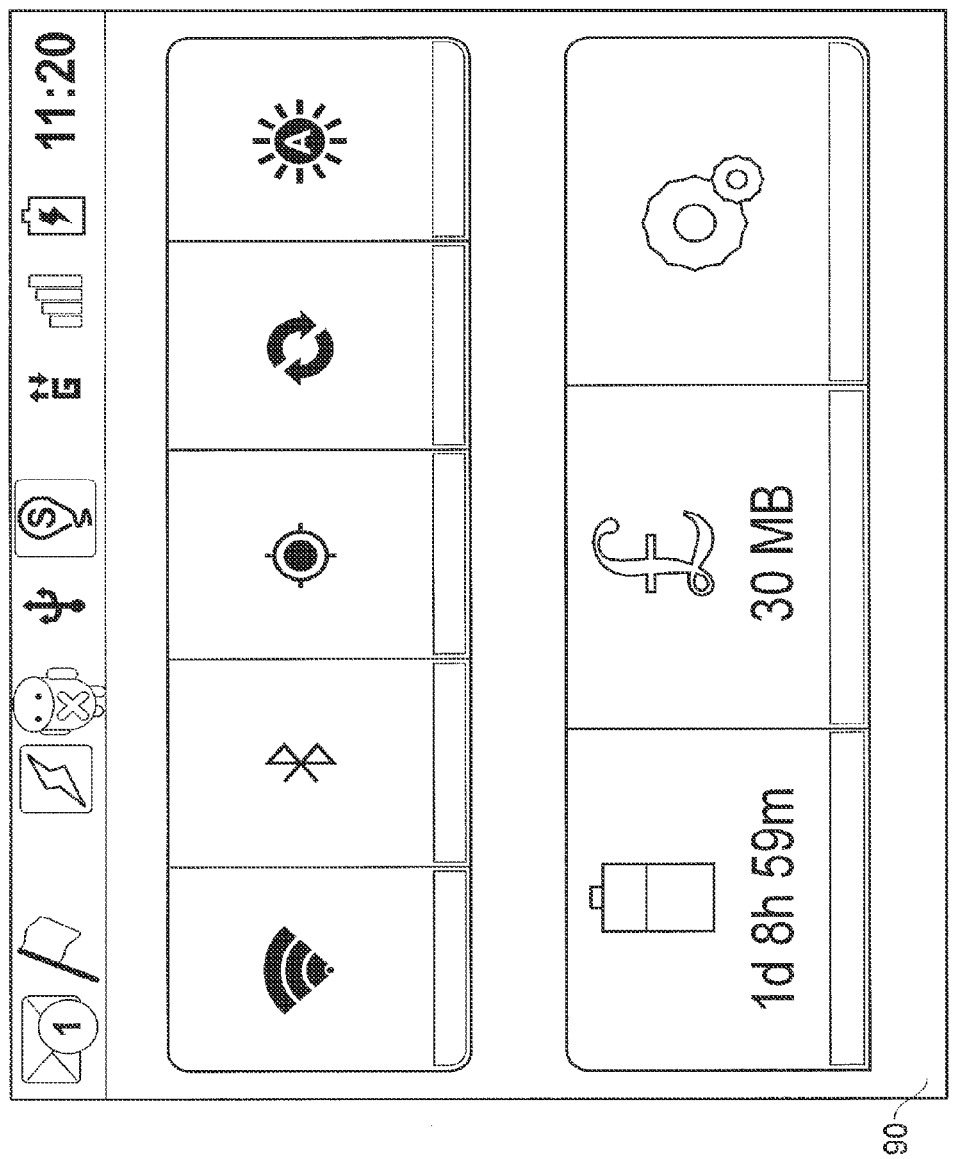
FIG. 6 is a screenshot of a user interface displayed on the mobile device.

Mobile network operators need to deliver better data value and may do this by charging according to the type of application. One way to achieve this is to specify and implement advanced billing and traffic enforcement solutions in the network. However, as this may be difficult for the user to come to terms with, the present embodiment provides a user interface that involves them in the process In particular, in the present embodiment the user's experience may be captured through simple configuration of:

1. When the battery can next be charged; and/or
2. How much data in a period the user is able to spend FIG. 6 shows an example widget that gives the user the ability to configure and monitor the simple user experience requirements, in accordance with the presently described embodiment.

In an embedded device, the above information will be configured when the device is typically fulfilled for deployment.

As a network operator will typically not want to aggressively traffic shape the user content, through a number of unique messages to device users, the present embodiment can encourage user moderated traffic management. For example, messages such as "Your current activity will result in extra charges", triggered by data intensive applications will keep the user informed of their usage impact.

To provide the user experience functionality, within the embodiment there is a statistical measure of traffic and battery usage. A predictive element may also continuously determine the end goal which is core to creating user feedback.

In addition, in the present embodiment an active cost and battery management measure is built in to the application to reduce unnecessary data activity on the cellular network. Two methods can be used; data delay and data aggregation. There are strict rules to providing the appropriate user experience, so rules are created to manage the active management methods differently depending on whether the device is in active use (screen is on) or in background use (screen is off). Data aggregation saves power by minimising the amount of time the radio components are powered on for. Data delay saves cost by only allowing expensive data types at specified times or on alternative networks such as WiFi.

The active data management of the present embodiment also introduces the concept of rules, and this is implemented within the embodiment as a policy engine. The policy engine can accept over-the-air policy push to allow for dynamic configuration of the mobile device. That is, in the present embodiment, the network operator can push new operating policies to the mobile device in accordance with the network operator's objectives. For example, if the network operator is about to or has already implemented traffic shaping in the network due to congestion or some other condition having occurred, then a new operating policy may be pushed to the mobile device over the radio interface of the device to help implement the traffic shaping. For example, the pushed policy may indicate to the device that traffic of a certain type should no longer be sent via a particular interface, or should instead be sent by an alternative interface. As a further example, the policy may indicate that the device should try to minimise traffic on its cellular interface, so as to help alleviate congestion on the cellular air interface. Minimising traffic may take the form, for example, of particular types of traffic or data being prevented from being sent over a particular interface. As a concrete but non-limiting example, it may be that video data is prevented from being received (or sent) over the cellular air interface.

Within the present embodiment the policy engine controls the accessibility of data according to any one or more of location, time of day and/or application type. This can also be extended to battery level. Such a policy engine has an advantage in that it is aligned with the policy equipment found in next generation mobile networks.

Figures 7A, 7B:
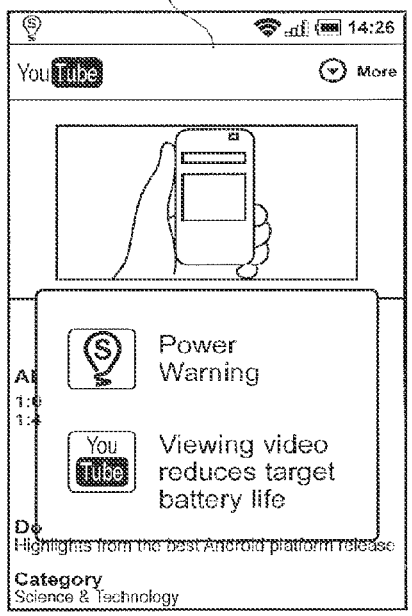
FIGS. 7(a) to (d) are further screenshots of user interfaces displayed on the mobile device.
Figures 7C, 7D:
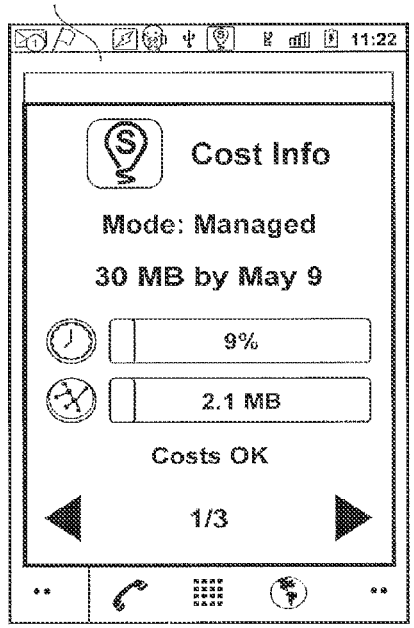
Figure 8:
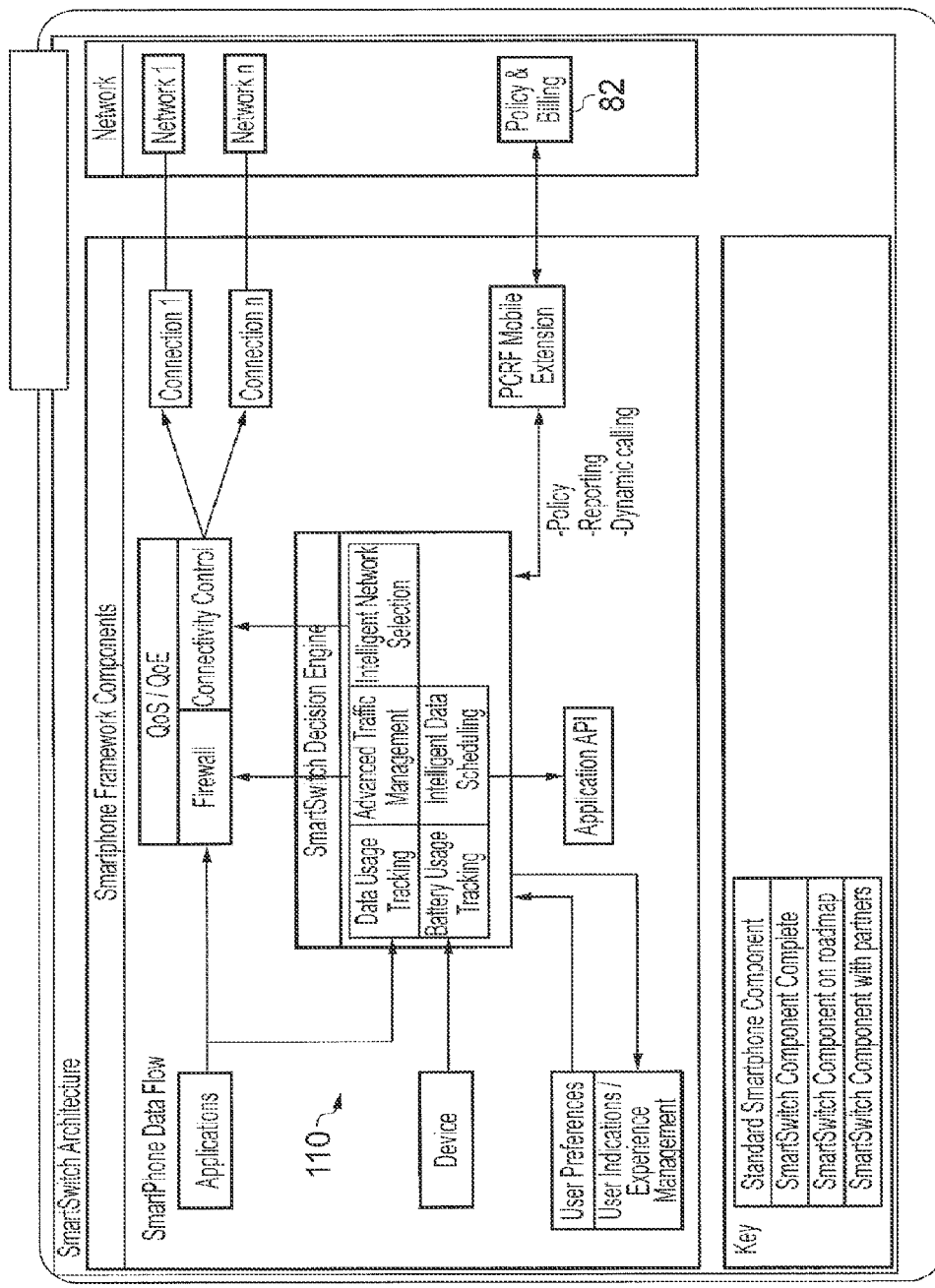
FIG. 8 is a system architectural block diagram of an embodiment of the invention.

Further details of the present embodiment are shown in FIGS. 7 and 8. In particular FIG. 7 shows example user interfaces that are used in the present example for, (a) User messaging, (b) Policy configuration, (c) Cost experience tracking and (d) Battery experience tracking FIG. 8 gives a more detailed view of the architecture of the present embodiment (referred to in FIG. 8 as "SmartSwitch"), and in particular helps to illustrate how the present embodiment provides a framework to bring together other data management components as well as integrate policy pushed from the network.

Further details will now be given of the operation of the policy engine of the present embodiment. Within the present embodiment the policy engine represents a mechanism for defining behavioral rules that are assessable at any time, i.e. can be evaluated using only the system state as context. The rules can in some embodiments be delegated to one or more expert agents.

Figure 9:
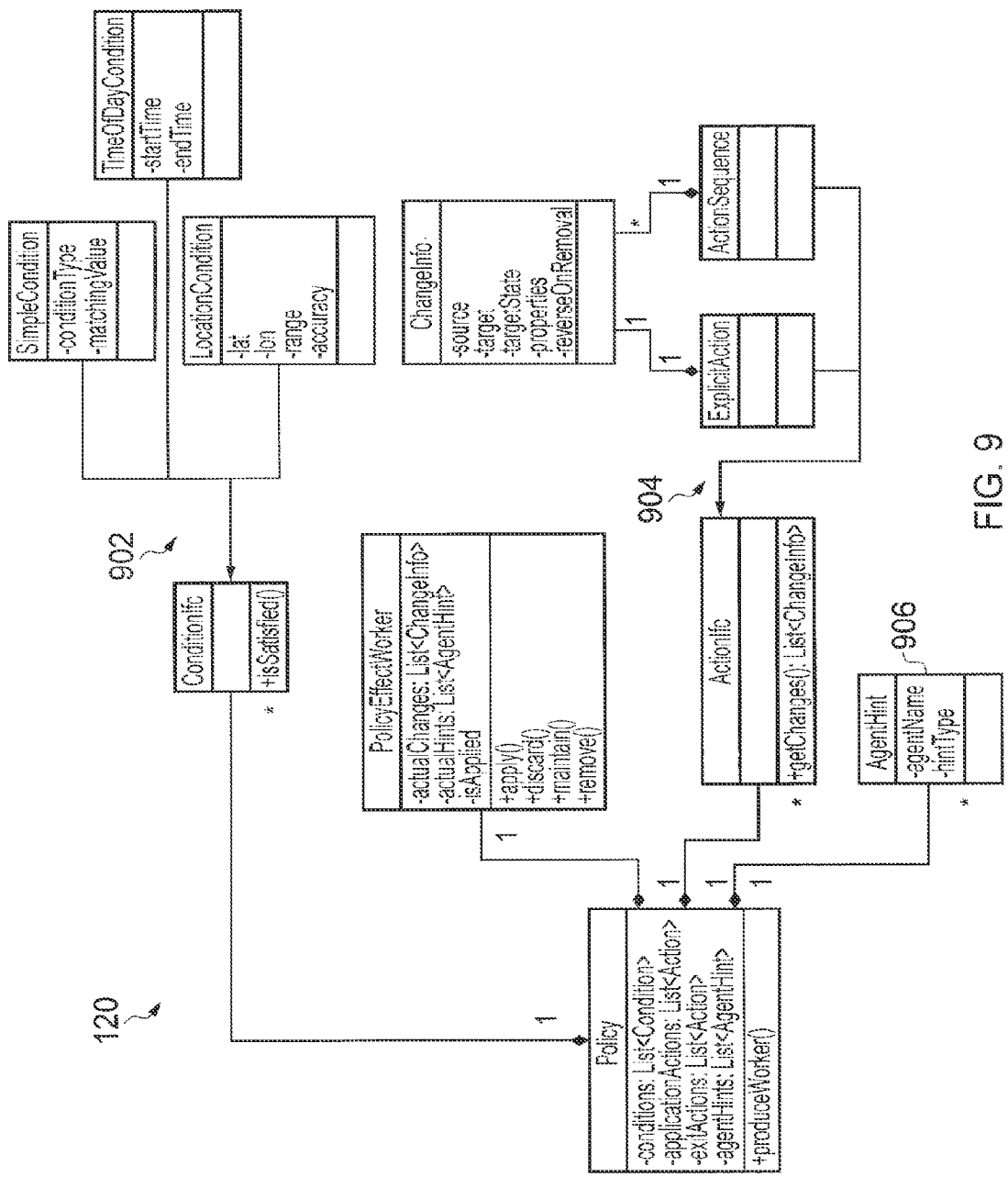
FIG. 9 is a diagram illustrating policy contents in an embodiment of the invention.

One structure for the policy definition is shown in FIG. 9, and discussed further below.

As shown in FIG. 9, in the present embodiment a policy may comprise:

Conditions (902) that a policy should be applied under, which may be states rather than one-off events Actions that a policy applies (904), which may comprise long term state changes rather than 'one-off' executions that do not have a lasting effect.

Actions to remove the policy (not shown)—these are optional and the same form as application actions Hints (906) which do not have an explicit behaviour, but are signals to the agent system Prioritisation information (not shown) that influences how conflicts with other policies should be resolved.

Conditions are relatively simple—they are used to query the system state, whether device or environmental, with some specified requirement that should be matched. In the present example embodiment there are two mechanisms for doing this:

A simple condition that describes a system state item (a.k.a. input) and the state that it must be in. The 'conformity' property may offer additional control over matching—for example, it is possible to require an exact match, the opposite or a range of acceptable values.

Purpose-specific conditions for testing time, location etc.

Actions, whether for policy application or removal, typically provide a device state to apply. They may be made up of atomic 'ChangeInfo' objects. These contain information about:

the state to change (e.g. WiFi enabled)

the new configuration for it (e.g. on)

the source of the change (set internally—either policy or agents)

whether to reverse the change when it is removed optional properties to add more information (e.g. a WiFi SSID and password)

Hints are much like an abstract action; they inform the system of some aim or factor, e.g. that data costs are high or that power savings should be prioritised. This is a form of delegation.

The logic for the inclusion of hints is that it would be foolish to try and replace specialist intelligent agents with a set of policies. For example, where a best network selection module and a cost management module is provided the policy structure allows for application of these modules' functions by simple delegation through a high level action.

However in the present embodiment it is not sufficient for actions to simply perform their role silently. In order to be collated and compared for conflict across multiple policies, it is preferable to represent the outcomes of actions in a common format.

One common format that may be used in the present embodiment uses the individual device state and an indication of the new configuration. The precise representation may, in most cases, be mirrored by the system (that is, the references to state & configuration shall be selected from values made available by the system). If this is not possible then the system may not be able to determine conflicts from the set of outcomes to apply.

Once a policy's conditions are met, it is then a candidate for application. However the conflict management system may veto some or all of its actions. Therefore in the present example the evaluation of any action works in two phases:
  Resolving it into the above representation without applying it
  Optionally, applying it, which should correspond to the provided representation Resolution works by comparing the type of action, and the proposed state if relevant. Some may conflict in terms of target (e.g. 'let duty cycle manage mobile data' vs. 'turn mobile data off') and some may conflict in terms of state (e.g. WiFi on vs. WiFi off). When encountering conflicts, in one embodiment the resolution process may decide which, if any, will be allowed. It is planned that rejecting an action rejects the whole policy to which it belongs.

Application of a policy works in the present embodiment via a 'change implementation' helper. This translates the change objects into calls to the output manager. Actions may be reversible so they are also passed through a change tracking helper, which stores the information necessary to reverse them. On removal they may be passed through a 'change unimplementer' which uses this information to restore prior state.

In the present example embodiment policy conflict resolution may be used to address two primary problems:
  conflicting outputs from multiple applicable policies
  state oscillation from cyclic policies (e.g. policy A applies a change, but the change is a trigger for policy B and it un-applies it, triggering A again)

The decision maker is ultimately responsible for conflict management, as it has visibility of all policies and their evaluation. Through evaluation of all policies' conditions, it obtains a set of applicable policies. From these it evaluates the actions, producing a set of proposed outcomes in terms understood by the system. Because they are meaningful to the generic system, the decision maker can examine them for conflicts, with links back to the policy that owns them. The difficulty is in knowing how to handle the cases where this occurs. Identified problems are:
  what to do where only some of the actions within a policy are in conflict?
  is it possible to have equal priority or some other state with no differentiation between conflicting pairs?

The policy (as a whole) should specify whether it is to be applied in full, or whether a partial selection of its actions is acceptable. In the present example embodiment, by default, it is to be assumed that partial application is not valid.

Figure 10:
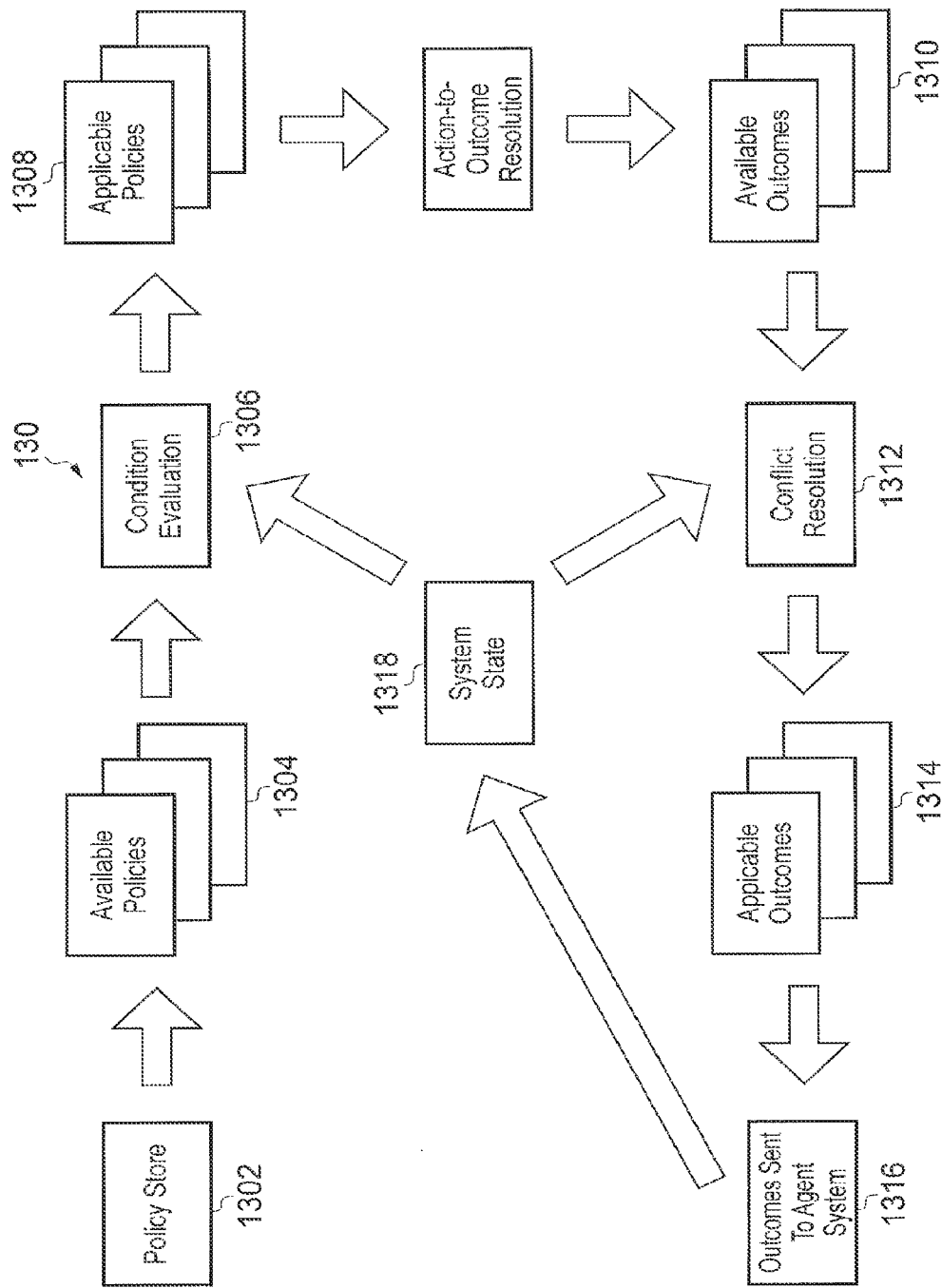
FIG. 10 is a flow diagram illustrating the method involved in evaluating when a policy is to apply in an embodiment of the invention.

FIG. 10 shows a policy evaluation as a flowchart. 130, used in the present embodiment. The flowchart sequence is as follows:

1. The set of all available policies (1304) is retrieved from the store (1302).
2. Each policy's set of conditions is evaluated (1306) against system state to determine if it is appropriate for application.
3. From this, a set of applicable policies (1308) is produced.
4. Each applicable policy contains actions and hints. Each policy translates to a set of atomic outcomes (1310), and each set is combined into an aggregate set.
5. The conflict resolution system (1312) determines what outcomes conflict, and which to remove, also based on their parent policies and their prioritization information.
6. This produces a set of non-conflicting applicable outcomes (1314).
7. These are delivered to the agent system (1316), where they are combined with agent outputs and eventually applied, i.e. the device state (1318) is changed.

In the present embodiment this sequence is initiated by the decision maker, most commonly when an event occurs and serves as a trigger. This raises another issue—it is not practical to perform this complex evaluation every time a minor event occurs, because it is going to create a significant overhead.

Figure 11:
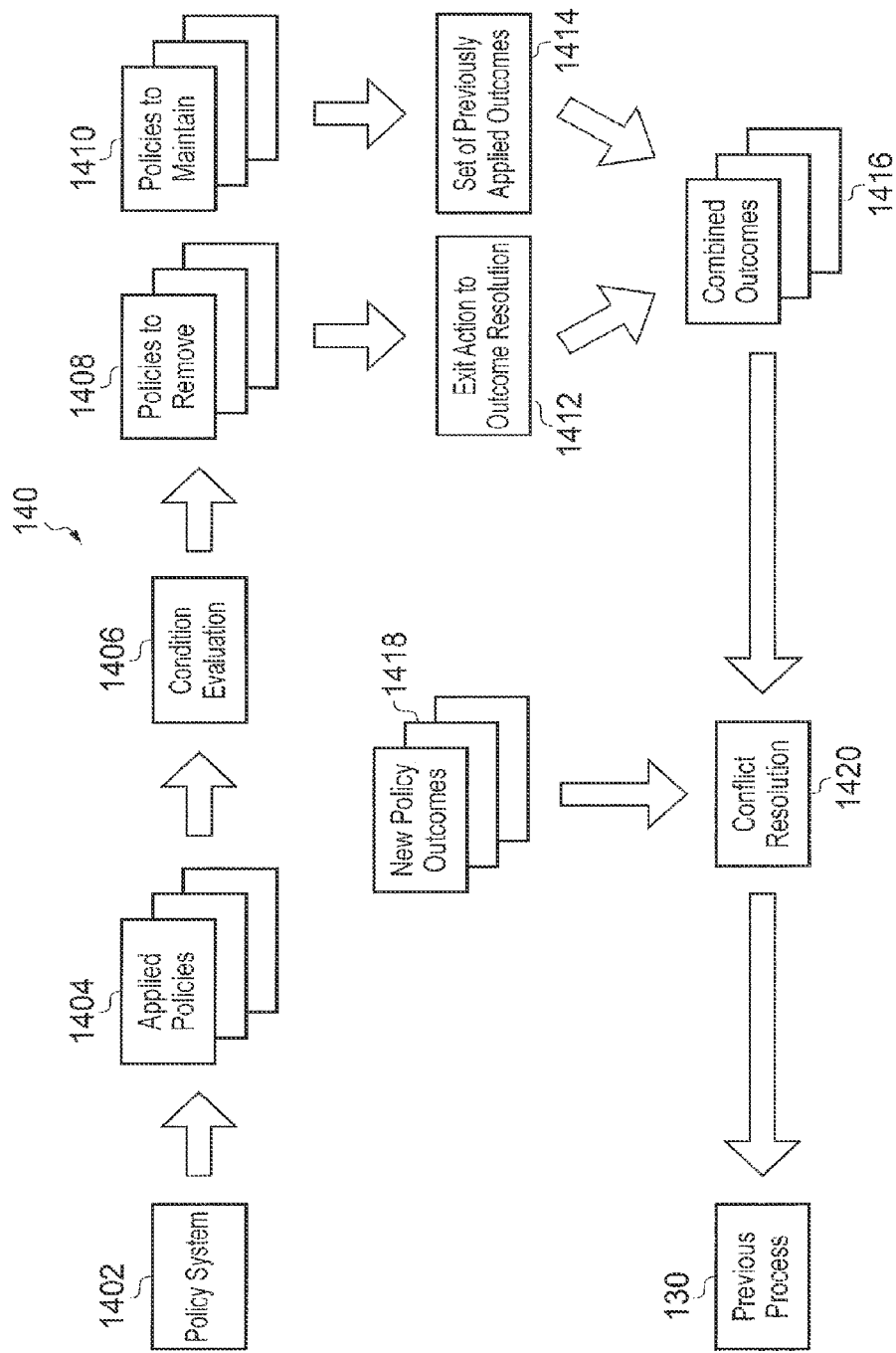
FIG. 11 is a flow diagram illustrating the method involved in evaluating when a policy should be removed in an embodiment of the invention.

An aspect missing from the previous diagram and sequence is policies that are already in effect. This is a similar process to before, with a few subtle differences, as shown in FIG. 11. Despite the separate representation, in the present embodiment this process is carried out simultaneously and in conjunction with the application of new policy shown previously in FIG. 10. The sequence this time is:

1. The currently applied policies (1404) are retrieved from the policy management system (1402).
2. Conditions (1406) are evaluated to determine if they still apply.
3. This produces:
   a. Policies to remove (1408)
   b. Policies that still apply (1410)
4. Policies to be removed are resolved into outcomes (1412), this time using their exit actions, which describe how to remove the policy. Previously the actions used were the application actions.
5. Policies to be maintained are not re-evaluated because the outcomes may be different to when they were applied, and not all evaluated outcomes may have actually been applied. Instead, the outcomes that were applied are tracked at application, and retrieved here (1414).
6. This produces a set of outcomes (1416) that are candidates to be applied now.
7. These candidate outcomes, and the candidate outcomes from policies that are not yet in effect (1418) (i.e. those described in the previous sequence) are combined, and conflict resolution (1420) is performed.
8. The outcome from conflict resolution is applied as before (FIG. 10).

Figure 12:
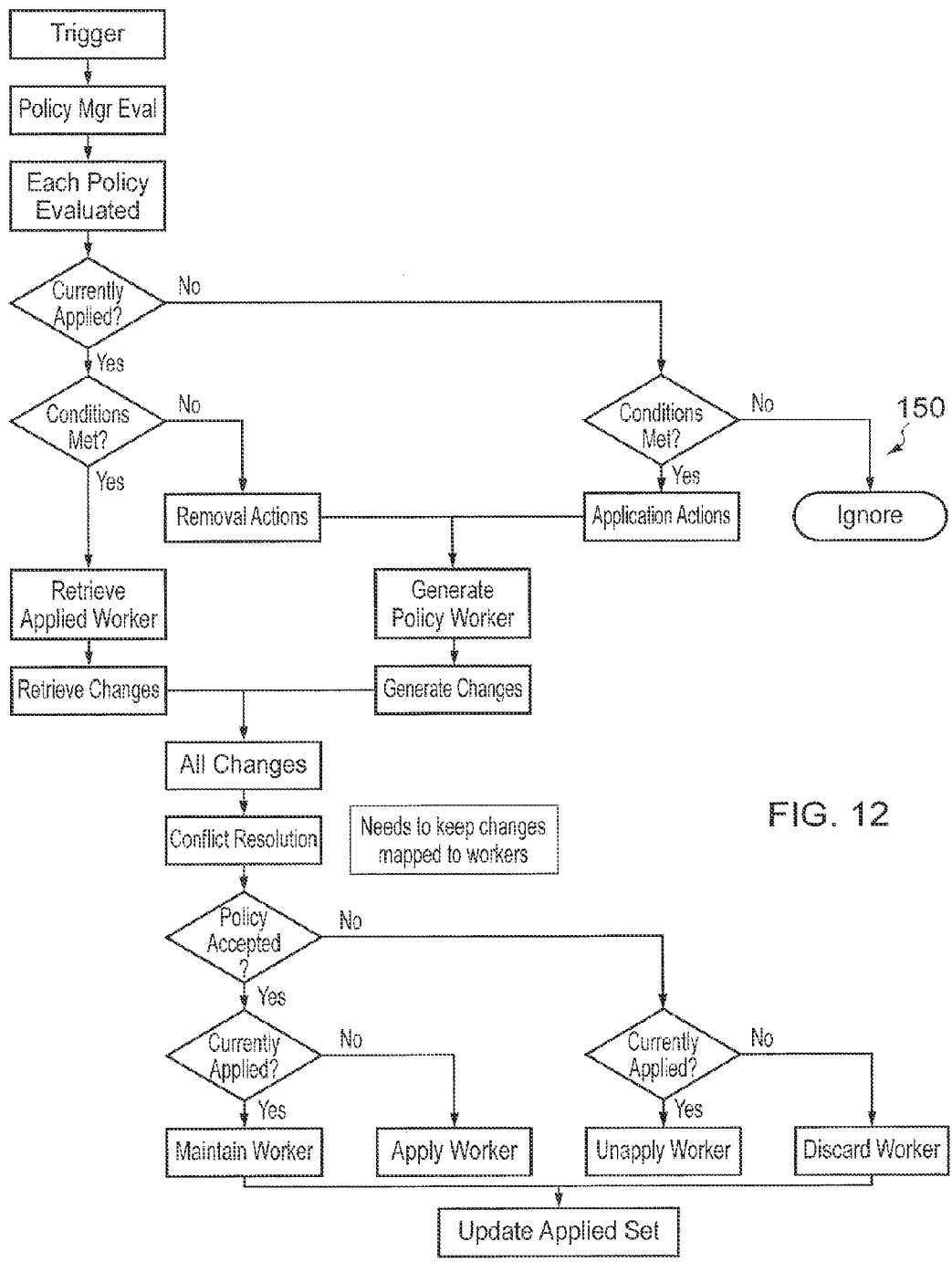
FIG. 12 is a flow diagram illustrating the application of a policy in an embodiment of the invention.

The evaluation flow for both application and removal, from the perspective of the policy manager and focused on dealing with a single policy, is shown in FIG. 12 In the present embodiment this flow (150) is performed every time that policy is evaluated. The most noteworthy concept not discussed thus far is that of the policy worker. A policy's actions are implemented by this worker, which is created anew for each application of the policy. The worker is required because something must maintain state for the lifetime of the policy's application, in order to facilitate cancellation or removal of the policy once applied. The set of actions belonging to the raw policy is not always sufficient in this regard because they may have been dynamically generated, and/or the removal actions may be based on what was actually applied. Keeping track via a worker allows a flexible approach to the application lifecycle.

Within the present embodiment the delivery of a policy set (for example a set of operating rules) takes place over the air radio interface between the device and the network operator. In addition, any changes to the policy should be savable over the air. One way of defining a policy set is to use XML—although there may be more efficient ways to send data over the air, but it is a good choice due to support lent by built-in Android/Java components such as parsers and file input/output.

In the embodiment it is expected that policy will be saved on the device's SD card, such that it can be updated when it changes and reloaded when the application starts. In addition, within the present embodiment that policy may be serializable, i.e. it must be possible to turn a policy and all of its properties into a string, and then later turn that string back into an identical object representation. To ensure that this external structure is produced correctly in a maintainable fashion, an XML schema (XSD) is used, of which further details are given later The deliverability of policy over the air to a device when required also requires a policy transport mechanism, i.e. how and when policy is delivered to the device. In this respect, as shown in FIG. 8 a network server component 82 responsible for hosting policy definition is provided. The device will fetch its policy from the server 82 using the data connection.

Policy fetch needs to occur on demand, so a trigger is required. In the present embodiment this may be implemented using the cloud-to-device messaging (C2DM) scheme, described further below. Receiving the message will cause the device to fetch its policy from a provided URL—the message is necessarily lightweight so does not contain policy information itself.

Regarding a specific use scenario of the ability to dynamically push new policy rule sets to a device such as a smartphone, operators incur a lot of capital expenditure in acquiring equipment to support the volume of growing smartphone traffic. The industry is defining and deploying standards to allow traffic shaping to occur on the network as a measure to reduce traffic load but also improve the value of data service (by charging more for particular services). The problem with limiting traffic in the network alone is that the air interface remains congested with signaling and data traffic. To address this problem, the dynamic policy push feature of the present embodiment allows for traffic management policies to be pushed to the device, extending the traffic shaping that will be carried out in the network to the device. For example, when traffic shaping or admission control policies are being implemented in the network, then to supplement these network policies a new operating policy can be pushed to the mobile devices that has the effect of reducing the radio traffic that the device generates. The benefit is then that the signaling and data then never occur on the air interface, freeing up valuable resources and saving cost in capital expenditure for network equipment.

One specific example of such an arrangement would be where the network operator has determined that severe congestion is occurring, and hence it takes a decision to temporarily block admission to the network of data traffic streams of a certain type, or requests for such data. For example, video data may be blocked. To support this decision, new policy is pushed to the mobile devices which instructs them to temporarily prevent requesting data of the certain type e.g. video data over the air interface.

Further specific details of the example embodiment relating to the policy engine and the policy interface are now given below, by way of example only. Various modifications, either by way of addition, deletion, or substitution may be made to provide for alternative embodiments.

In the present embodiment the policy engine allows for the device to manage data flows and interact with the user according to set policies and rules. The policy engine utilises Google's C2DM interface to allow policies to be remotely pushed from "the cloud". This document defines the message formats and flow of communications over the interfaces that are required to implement policy controlled functionality on the mobile devices.

As mentioned previously, in the present embodiment policy is delivered in an XML format. An XML Schema (XSD) provides the precise structure of this format, and further details of the various elements and parameters of this are given, by way of non-limiting example, below.

EXAMPLE

```
<?xml version="1.0" encoding="utf-8"?>
<policies
    xmlns:xsi="http://www.w3.org/2001/XMLSchema-instance"
    xmlns:policy="http://nowhere/policy policy.xsd"
    xsi:noNamespaceSchemaLocation="policy.xsd">
    <policy name="Browser Policy" toastID="BROWSER">
        <conditionList>
            <condition
                xsi:type="SimpleCondition"
                target="ACTIVE_APP"
                value="com.android.browser"
                description="Browser Active"
                />
        </conditionList>
        <addActions>
            <action
                target="WIFI_ENABLED"
                state="ENABLED"
                description="Enable Wi-Fi"
                reversalOnRemoval="true"
                />
        </addActions>
    </policy>
</policies>
```

The example above shows a policy file containing only one policy. Further details of various aspects of the XML components are given below.

Policy Attributes
  name: this is used to identify the policy and in any related displays
  toastID: this is optional; it references a known 'toast'—a popup message that is displayed when the policy is applied Policy Members
  conditions: these are the conditions that must be satisfied for the policy to be applied. Currently all conditions must be satisfied at once. There are different XML types for different types of condition.
  addActions: these are the actions that are applied when the policy is put into effect, and they are maintained for as long as it still applies
  removeActions: (not shown) these are the actions to be applied once when an applied policy is removed.

agentHints: (not shown) these are hints to the agent system, rather than explicit actions to be put into effect; i.e. delegation of responsibility to some agent Condition Types & Attributes SimpleCondition: a key/value match condition, e.g. 'Wi-Fi state' must be 'connected'. Keys and possible values are listed in a table in this document. Attributes:
target: the key name
value: the value that must be matched LocationCondition: a geographic condition that must be matched by the device's location finding system. Attributes:
latitude: the required latitude
longitude: the required longitude
rangeMetres: the max. acceptable distance in metres from this lat/lon position
requiredAccMetres: the max. acceptable accuracy of the device's position; for instance the specification of a 50 m position match is no good if matched exactly by a 2 km accuracy cell-based device location TimeOfDayCondition: currently a 24-hour based clock condition that allows definition of a time period in which the condition is satisfied. Times that wrap around midnight are allowed, e.g. 23:00 to 05:45. Attributes:
startHour
startMin
endHour
endMin SimpleCondition Keys & Values

| ACTIVE_APP | An Android application package name |
| WIFI_ENABLED | true/false |
| WIFI_CONNECTED | true/false |
| DISPLAY_ACTIVE | true/false |

Action Attributes property: optional; one or more key/value pairs (attributes named as such) to provide extra information about this action. Relevant properties are shown in the actions table.
target: the action to implement, typically some component of the system to affect
state: the new state of the target, or 'irrelevant' if the target requires no state
description: a text description for display purposes only
reversalOnRemoval: whether to track existing state and restore it on removal of this action Action Targets, States and Extra Properties

| WIFI_ENABLED | The Wi-Fi adapter enable state |
| WIFI_NET_AUTH | The Wi-Fi configured network list |
| WIFI_NET_SELECT | The currently selected Wi-Fi network |
| SCHEDULER_MODE | The data scheduler (not implemented yet) |
| DUTY_CYCLE_MO-BILE_DATA_FOR_COST | Give the cost duty cycler control of data |
| DUTY_CYCLE_MO-BILE_DATA_FOR_POWER | Give the power duty cycler control of data |
| AIRPLANE_MODE | Enables the device's airplane mode |
| MOBILE_DATA_FIREWALL | The SmartSwitch firewall for mobile data |
| WIFI_DATA_FIREWALL | The SmartSwitch firewall for Wi-Fi data |
| ALL_DATA_FIREWALL | The SmartSwitch firewall for all data (mobile & Wi-Fi) |

WIFI_ENABLED
Possible states:
ENABLED
DISABLED
WIFI_NET_AUTH
Possible states:
NETWORK_AUTH: Authorise a network
NETWORK_FORGET: Drop authorise of a previously authorised network
Required property keys:
ssid: the Wi-Fi SSID to authorise/forget
auth: if adding authorisation, the Wi-Fi password
WIFI_NET_SELECT
No state required—use IRRELEVANT
Required property keys:
ssid: the Wi-Fi SSID to connect to
DUTY_CYCLE_MOBILE_DATA_FOR_COST and
DUTY_CYCLE_MOBILE_DATA_FOR_POWER
No state required—use IRRELEVANT
No properties required
AIRPLANE_MODE
No state required—use IRRELEVANT
No properties required
MOBILE_DATA_FIREWALL and
WIFI_DATA_FIREWALL and
ALL_DATA_FIREWALL
Possible states:
FIREWALL_CONFIGURE: Configure a custom firewall
FIREWALL_MINIMAL: Apply a minimal-access firewall, i.e.
FIREWALL_OFF: Remove any firewall
FIREWALL_MODE: Change the firewall operating mode
Properties for FIREWALL_CONFIGURE:
whitelistProtocols: allowed network protocols; a semi-colon separated list of protocols, which are described separately in this document.
blacklistApps: a semi-colon separated list of blacklisted application package names that will be denied network access
blacklistUsers: a semi-colon separated list of blacklisted users that will be denied network access. Required because some Android apps use a non-application user, e.g. the 'media' user streams video content for YouTube
Properties for FIREWALL_MINIMAL: None required
Properties for FIREWALL_ OFF: None required
Properties for FIREWALL_ MODE:
mode: a firewall mode from in the table in this document Firewall Modes

| OPEN | All data is allowed through. |
| BLACKLIST | The blacklisted users, apps and protocols are blocked. Remaining data is allowed through. |

-continued

| | |
|---|---|
| WHITELIST | The whitelisted users, apps and protocols are allowed. Remaining data is blocked. |
| COMBINED_PRIORITY_BLACK | The blacklist is applied first, then the white list, then remaining data is rejected. |
| COMBINED_PRIORITY_WHITE | The whitelist is applied first, then the blacklist, then remaining data is allowed. |
| CLOSED | No data is allowed through. |

Protocol Description

In the present embodiment protocols are written in the form:
   PROTOCOL:direction;portType;startPort-endPort;
e.g.:
   PROTOCOL:OUTGOING;TCP;110-110;
describes outgoing POP3 email.
The possibilities for the parameters are as follows:
   Direction:
      INCOMING: Match only incoming traffic
      OUTGOING: Match only outgoing traffic
      BOTH: Match all traffic
   Port Type:
      TCP: Match only TCP traffic
      UDP: Match only UDP traffic
      BOTH: Match TCP & UDP traffic Hint Attributes
   agent: the name of the specific agent this should be delivered to; if not supplied, it is considered to be a general hint to the whole agent system
   hint: the hint type, selected from the hint table in this document
   description: a text description for display purposes Hint Types

| | |
|---|---|
| HIGH_DATA_VOLUME | Expect high data volume whilst this hint is in effect, and behave accordingly (e.g. choose a higher bandwidth network) |
| LOW_DATA_VOLUME | Expect lower data volume whilst this hint is in effect, and behave accordingly (e.g. choose a lower power network) |
| COST_OF_DATA_HIGH | Informs that data is expensive. The system may try to reduce its use or change network to achieve lower cost. |
| COST_OF_DATA_LOW | Informs that data is cheap. The system may try to increase its use or e.g. despatch previously collected requests. |
| POWER_OF_DATA_HIGH | Informs that there will be a raised power cost to using data, e.g. because of a weak signal. |
| POWER_OF_DATA_LOW | Informs that there will be a lower power cost to using data. |
| SEEK_POWER_SAVING | Express aim of reduced power consumption whilst hint is in effect. |
| SEEK_PERFORMANCE | Express aim of increased network performance whilst hint is in effect. |
| SEEK_MOBILITY | Express aim of network selection suited to mobility whilst hint is in effect, e.g. avoid short range Wi-Fi networks as the connection will soon be lost. |
| MAINTAIN_CONNECTION | Express aim of maintaining a seamless connection to a network (the current network?) whilst hint is in effect. |
| PREFERRED_NETWORK | Express the aim of using a particular network (details carried via properties) where possible. |

In summary therefore, embodiments of the invention provide the ability to use policy defined by the operator or other service provider to control the interfaces on which data is sent and received by a device. The policy can be dynamically updated by the operator or other service provider, by pushing new policy to the device for implementation. The policy can define that the device should switch certain data between two or more available interfaces at certain times, or may define when certain data may be sent or received over a particular interface. Advantageously, the device may receive new policy from the operator or other service provider in order to help with the operator's or provider's own operational objectives. For example, the operator may be engaging in traffic shaping or other traffic limitation, for example to ease congestion or enforce service agreements. To support this a policy which implements corresponding traffic limitation or shaping on the air interface between the mobile device and network base stations can be sent to the mobile device. This will have the effect of reducing signaling congestion on the air-interface.

Various modifications, whether by way of addition, deletion, or substitution may be made to the above described embodiments to provide additional embodiments, any and all of which are intended to be encompassed by the appended claims.

The invention claimed is:

1. A method comprising:
transferring a first portion of data between one or more data sources and a mobile device through a first access network;
receiving, by a control module in the mobile device and from a server, a configuration update comprising a policy that indicates to the mobile device one or more data transfer adaptation rules including one or more data characteristics and one or more traffic-shaping measures to be applied to a second portion of the data having the one or more data characteristics;
responsive to receipt of the policy, initiating a connection through a second access network; and
transferring the second portion of the data having the one or more data characteristics through the second access network.

2. A method according to claim 1, wherein the data characteristics define one or more of:
i) a particular type of data;
ii) a period of time for which the transfer of data is to occur through the second access network;
iii) a location at which the transfer of data is to occur through the second access network; and
iv) data associated with a particular application that requests or generates data.

3. A method according to claim 1, wherein the policy defines data characteristics of data traffic to be limited over the first access network.

4. A mobile device, comprising:
at least one physical network interface; and
a processor configured to run a control module that, with the at least one physical network interface, causes the mobile device to:
receive a configuration update comprising a policy that indicates to the mobile device one or more data transfer adaptation rules including one or more data characteristics and one or more traffic-shaping measures to be applied to data having the one or more data characteristics;

transfer a first portion of data between one or more data sources and the mobile device through a first access network;
responsive to receipt of the policy, initiate a connection through a second access network; and
transfer a second portion of the data having the one or more data characteristics through the second access network.

\* \* \* \* \*